(12) United States Patent
Fang et al.

(10) Patent No.: US 12,363,778 B2
(45) Date of Patent: Jul. 15, 2025

(54) MECHANISMS TO REDUCE THE WORST-CASE LATENCY FOR ULTRA-LOW LATENCY APPLICATIONS

(71) Applicant: Intel Corporation, Santa Clara, CA (US)

(72) Inventors: Juan Fang, Portland, OR (US); Dave Cavalcanti, Portland, OR (US); Jeffrey Foerster, Portland, OR (US); Minyoung Park, San Ramon, CA (US); Yi Zhang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 17/645,870

(22) Filed: Dec. 23, 2021

(65) Prior Publication Data

US 2022/0124858 A1    Apr. 21, 2022

(51) Int. Cl.
*H04W 4/00* (2018.01)
*H04W 76/15* (2018.01)

(52) U.S. Cl.
CPC .................. *H04W 76/15* (2018.02)

(58) Field of Classification Search
CPC ... H04W 76/15; H04W 72/23; H04W 72/569; H04W 84/12
See application file for complete search history.

(56) References Cited

U.S. PATENT DOCUMENTS

| | | | |
|---|---|---|---|
| 2021/0014911 A1 | 1/2021 | Patil et al. | |
| 2021/0266891 A1 | 8/2021 | Chu et al. | |
| 2021/0321450 A1 | 10/2021 | Cariou et al. | |
| 2023/0140556 A1* | 5/2023 | Ko | H04L 45/245 370/329 |
| 2023/0199641 A1* | 6/2023 | Naik | H04W 76/15 370/318 |

FOREIGN PATENT DOCUMENTS

| | | |
|---|---|---|
| WO | 2020251197 A1 | 12/2020 |
| WO | 2021107685 A1 | 6/2021 |

OTHER PUBLICATIONS

International Search Report and Written Opinion issued Apr. 5, 2023 in Application No. PCT/US2022/050977, 11 pages.
International Preliminary Report on Patentability mailed Jul. 4, 2024 in Application No. PCT/US2022/050977, 7 pages.

* cited by examiner

*Primary Examiner* — Omoniyi Obayanju
(74) *Attorney, Agent, or Firm* — Eversheds Sutherland (US) LLP

(57) ABSTRACT

This disclosure describes systems, methods, and devices related to latency reduction. The device may set up a plurality of links between an access point (AP) multi-link device (MLD) and a non-AP MLD. The device may encode a frame for transmission on a first link of the plurality of links between a first AP of the AP MLD and a first STA of the non-AP MLD. The device may identify an indication received at a second STA of the non-AP MLD using an interference mitigation signal. The device may cause to stop the transmission of the frame on the first link based on the indication. The device may identify a second frame on the first link received from the first AP. The device may cause to resume the transmission of the first frame on the first link.

20 Claims, 19 Drawing Sheets

MECHANISMS TO REDUCE THE WORST-CASE LATENCY FOR ULTRA-LOW LATENCY APPLICATIONS

TECHNICAL FIELD

This disclosure generally relates to systems and methods for wireless communications and, more particularly, to mechanisms to reduce the worst-case latency for ultra-low latency applications.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 3 depicts an illustrative schematic diagram for a control frame for latency reduction, in accordance with one or more example embodiments of the present disclosure.

DETAILED DESCRIPTION

Figure 1A:
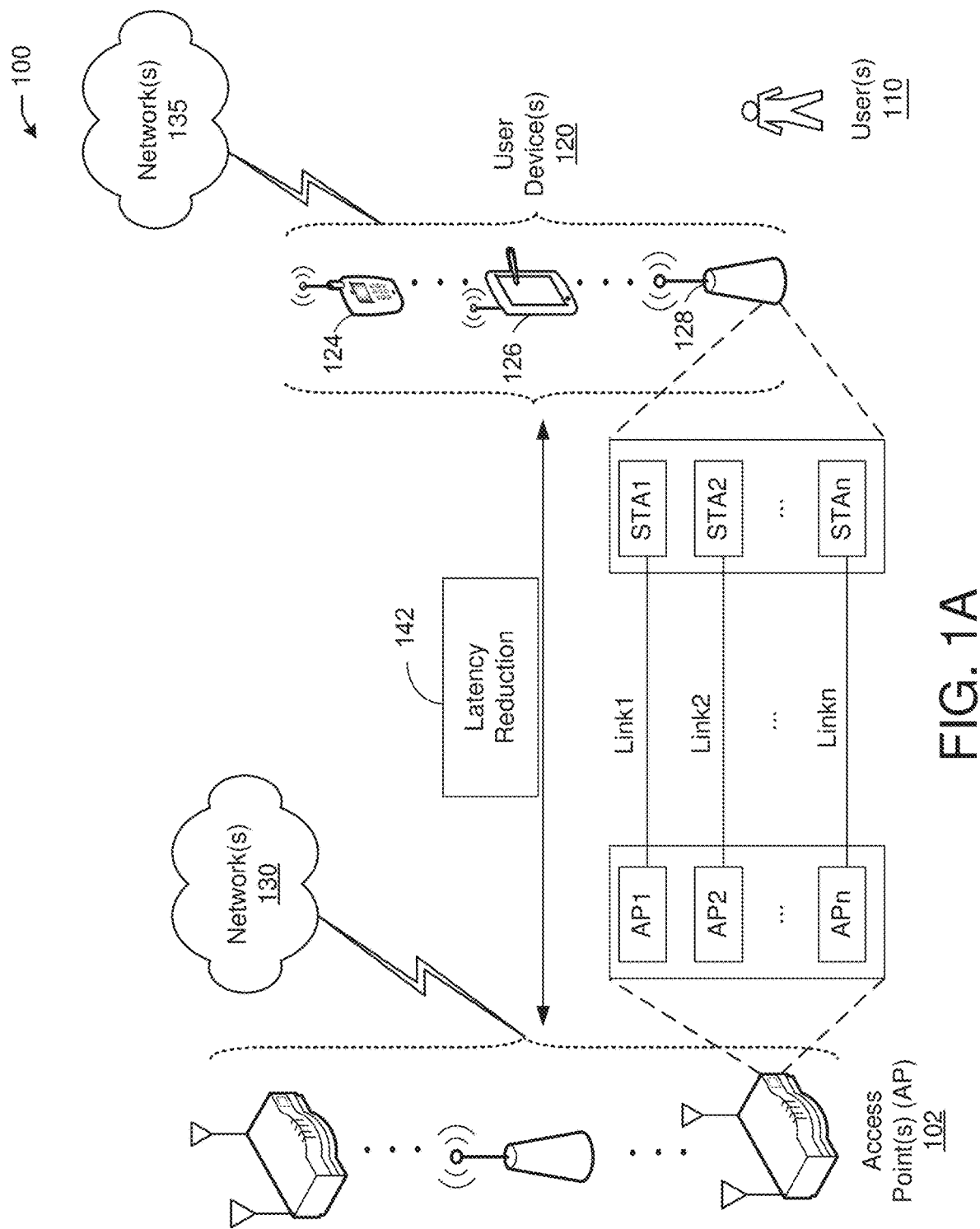
FIG. 1A is a network diagram illustrating an example network environment for latency reduction, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

To increase the overall throughput of Wi-Fi devices, transmit opportunity (TXOP) and frame aggregation was introduced in 802.11n and subsequent standards. This aggregation makes the PPDU data payload much bigger and therefore occupies much longer airtime.

Although frame aggregation helps improve throughput and reduce average latency for a pair of STAs, it can result in a much higher worst-case latency for a $3^{rd}$ party STA waiting for the wireless medium to be idle due to much longer airtime occupied by a long aggregated PPDU between the pair of STAs. Time-sensitive frames may experience a higher latency if the channel is occupied by a long PPDU transmission by other devices from the same BSS or overlapping BSS (OBSS).

With the introduction of multiple link capability in 802.11be, this problem can be mitigated if a client device supports simultaneous transmission and reception (STR) and if there is at least one link idle. However, this problem still exists if a client device is a non-STR device, which cannot simultaneously transmit and receive on 2 or more links.

In 802.11be, an MLD (multi-link device) is defined as follows: A device that is a logical entity and has more than one affiliated station (STA) and has a single medium access control (MAC) service access point (SAP) to logical link control (LLC), which includes one MAC data service.

In a BSS, an AP MLD (multi-link device) is a STR AP MLD, which can transmit and receive frames over multiple links (i.e. channels), such as channel 1 and channel 2, at the same time. There are STR non-AP MLDs and non-STR non-AP MLDs. The STR non-AP MLD is able to transmit and receive frames over multiple channels, such as channel 1 and channel 2, at the same time. The non-STR non-AP MLD is only able to transmit or receive frames over channel 1 and channel 2 at the same time but cannot transmit and receive frames on channel 1 and channel 2 simultaneously.

It is proposed to control the TXOP length to be less than a certain value to solve this problem, however, it is at the cost of throughput loss. This proposal can reduce the worst-case latency for ultra-low latency applications. However, it is very inefficient in terms of spectrum efficiency.

A solution is proposed to solve the problem in this scenario. However, on the other hand, if both of the two channels are occupied by any ongoing transmission from the same or overlapping BSS (OBSS), this problem still exists.

In 802.11, to improve the overall throughput and latency of Wi-Fi devices, multi-user (MU) OFDMA was introduced in 802.11ax. OFDMA is ideal for low-bandwidth, small-packet applications such as IoT sensors, controllers, etc. In the Downlink phase, the AP can schedule the data transmission to multiple users simultaneously using DL-MU-OFDMA while it has downlink data packets for multiple users in the transmission queue. However, in the uplink phase, the AP needs to be aware of the buffer status of each STA for the following UL MU-OFDMA transmission scheduling, which is obtained by AP sending a "buffer status report" trigger frame to multiple STAs. Upon reception of the trigger frame, the STAs will feedback the buffer status report based on the queued UL data. Based on the buffer status report received from each STA, the AP schedules the UL resource units for the UL MU OFDMA transmissions. In order to obtain the buffer status of each STA, the AP needs to trigger each STA with a certain periodicity, which could lead to under-utilization of the resources and also increased latency.

Example embodiments of the present disclosure relate to systems, methods, and devices for Methods and mechanisms to reduce the worst-case latency for ultra-low latency applications in Next Generation Wi-Fi.

In one or more embodiments, a latency reduction system may facilitate mechanisms to reduce the worst-case latency for ultra-low latency applications for non-STR non-AP MLD in 802.11be, which is expected to be the majority of deployments.

In one or more embodiments, a latency reduction system may facilitate mechanisms to reduce the worst-case latency for ultra-low latency applications for small packets in Wi-Fi networks while all the operation channels are being occupied by other STAs within the BSS or OBSS, which is expected to be seen in high dense Wi-Fi deployed environment.

Low latency and reliable communications are some of the main gaps in existing Wi-Fi radios (including 802.11ax) and there is an opportunity to address these problems in 802.11be or in WiFi8 (next gen Wi-Fi) with multiple links or other new capabilities. The mechanisms proposed in this disclosure will enable the low latency application for non-STR non-AP MLD in 802.11be that is only able to transmit or receive a packet at the same time.

In one or more embodiments, a latency reduction system may define a new scheduling request signal, which is generated by ZC sequence and is only around 10-20 microseconds long, to enable the STA to request to be scheduled faster for time-critical data that just arrived and also avoid the spectrum under-utilization due to the periodic "buffer status report" trigger procedure in the UL MU OFDMA. It can enable the STA to be scheduled faster for time-critical data that just arrived and also avoid the spectrum under-utilization due to the periodic "buffer status report" trigger procedure in the UL MU OFDMA.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment of latency reduction, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 12:
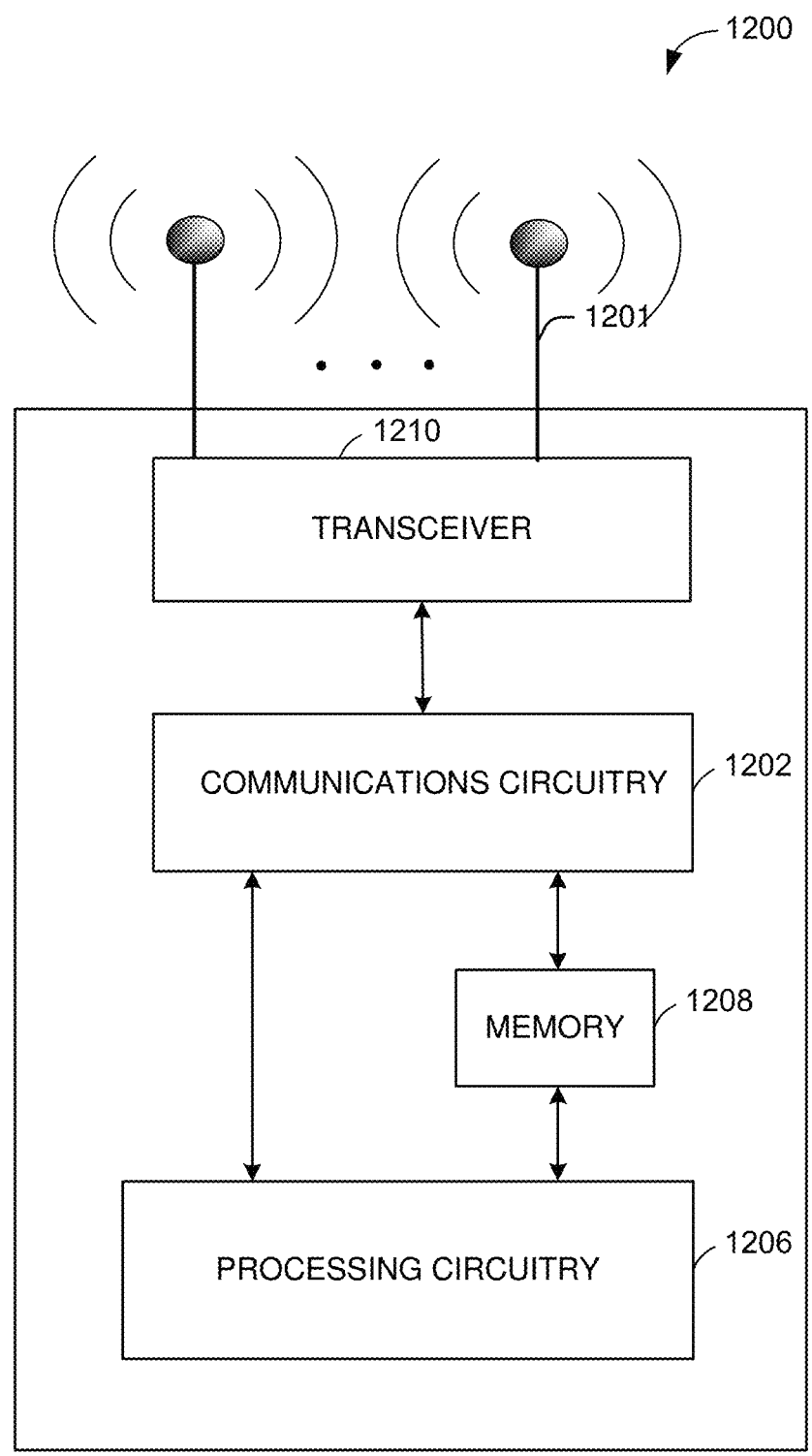
FIG. 12 illustrates a functional diagram of an exemplary communication station that may be suitable for use as a user device, in accordance with one or more example embodiments of the present disclosure.
Figure 13:
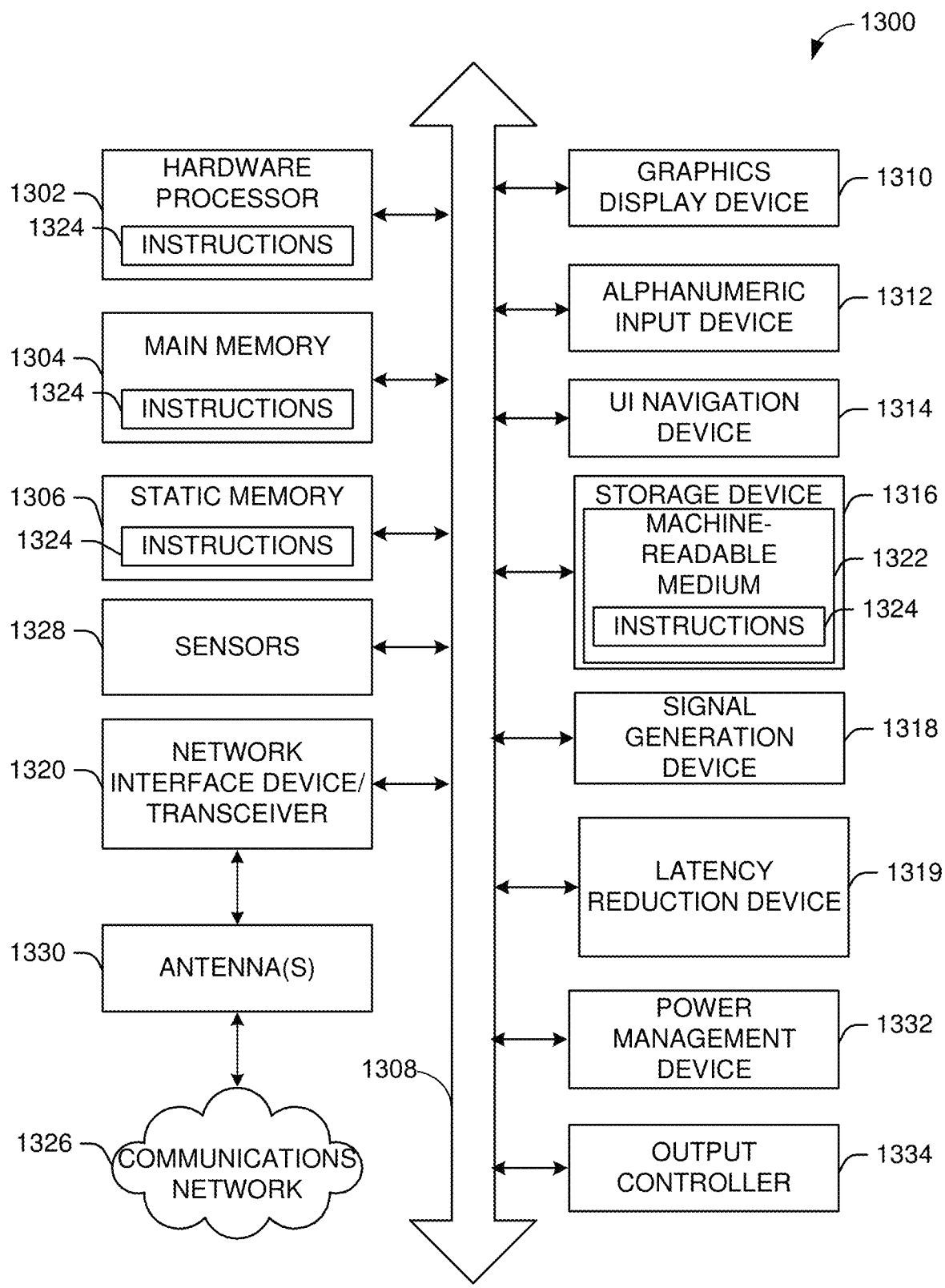
FIG. 13 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 12 and/or the example machine/system of FIG. 13.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax, 802.11be, etc.), 6 GHz channels (e.g., 802.11ax, 802.11be, etc.), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, a user device 120 may be in communication with one or more APs 102. For example, one or more APs 102 may implement a latency reduction 142 with one or more user devices 120. The one or more APs 102 may be multi-link devices (MLDs) and the one or more user device 120 may be non-AP MLDs. Each of the one or more APs 102 may comprise a plurality of individual APs (e.g., AP1, AP2, . . . , APn, where n is an integer) and each of the one or more user devices 120 may comprise a plurality of individual STAs (e.g., STA1, STA2, . . . , STAn). The AP MLDs and the non-AP MLDs may set up one or more links (e.g., Link1, Link2, . . . , Linkn) between each of the individual APs and STAs. It is understood that the above descriptions are for purposes of illustration and are not meant to be limiting.

Figure 1B:
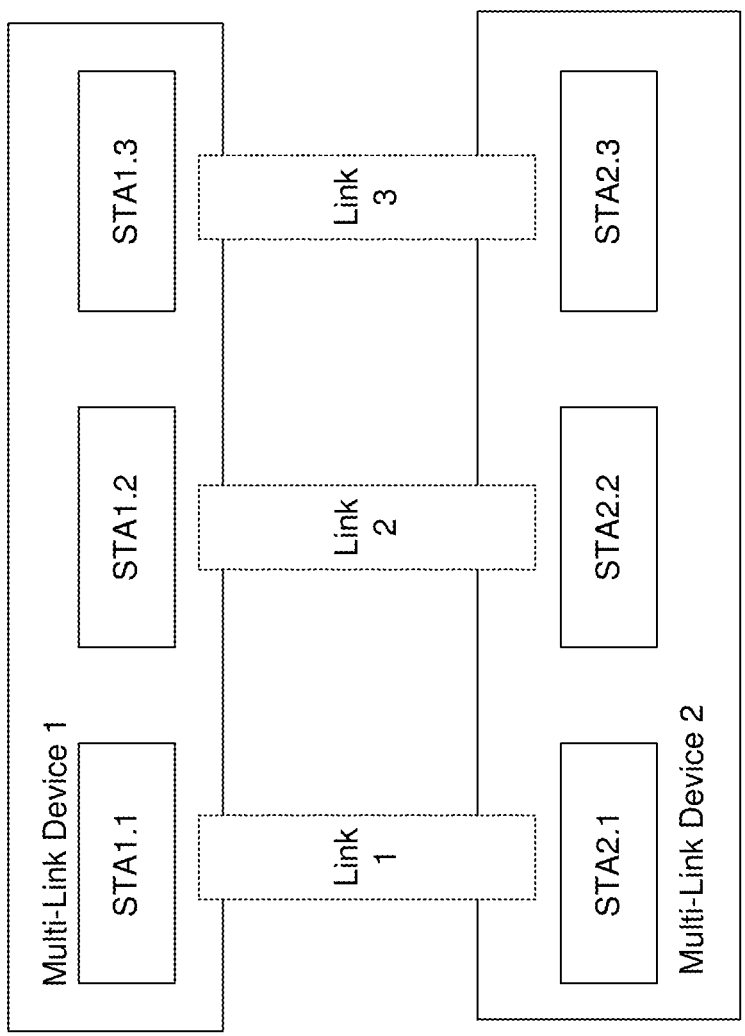
FIG. 1B depicts an illustrative schematic diagram for a multi-link device (MLD) between two logical entities, in accordance with one or more example embodiments of the present disclosure.

FIG. 1B depicts an illustrative schematic diagram for two multi-link devices (MLDs), in accordance with one or more example embodiments of the present disclosure.

Referring to FIG. 1B, there are shown two MLDs, where each MLD includes multiple STAs that can set up links with each other. An MLD may be a logical entity that contains one or more STAs. The MLD has one MAC data service interface and primitives to the logical link control (LLC) and a single address associated with the interface, which can be used to communicate on the distribution system medium (DSM). It should be noted that an MLD allows STAs within the MLD to have the same MAC address. It should also be noted that the exact name can be changed.

In this example of FIG. 1B, the MLD 1 and MLD 2 may be two separate physical devices, where each one comprises a number of virtual or logical devices. For example, MLD 1 may comprise three STAs, STA1.1, STA1.2, and STA1.3 and MLD 2 that may comprise three STAs, STA2.1, STA2.2, and STA2.3. The example shows that logical device STA1.1 is communicating with logical device STA2.1 over link 1, that logical device STA1.2 is communicating with logical device STA2.2 over link 2, and that device STA1.3 is communicating with logical device STA2.3 over link 3.

Figure 1C:
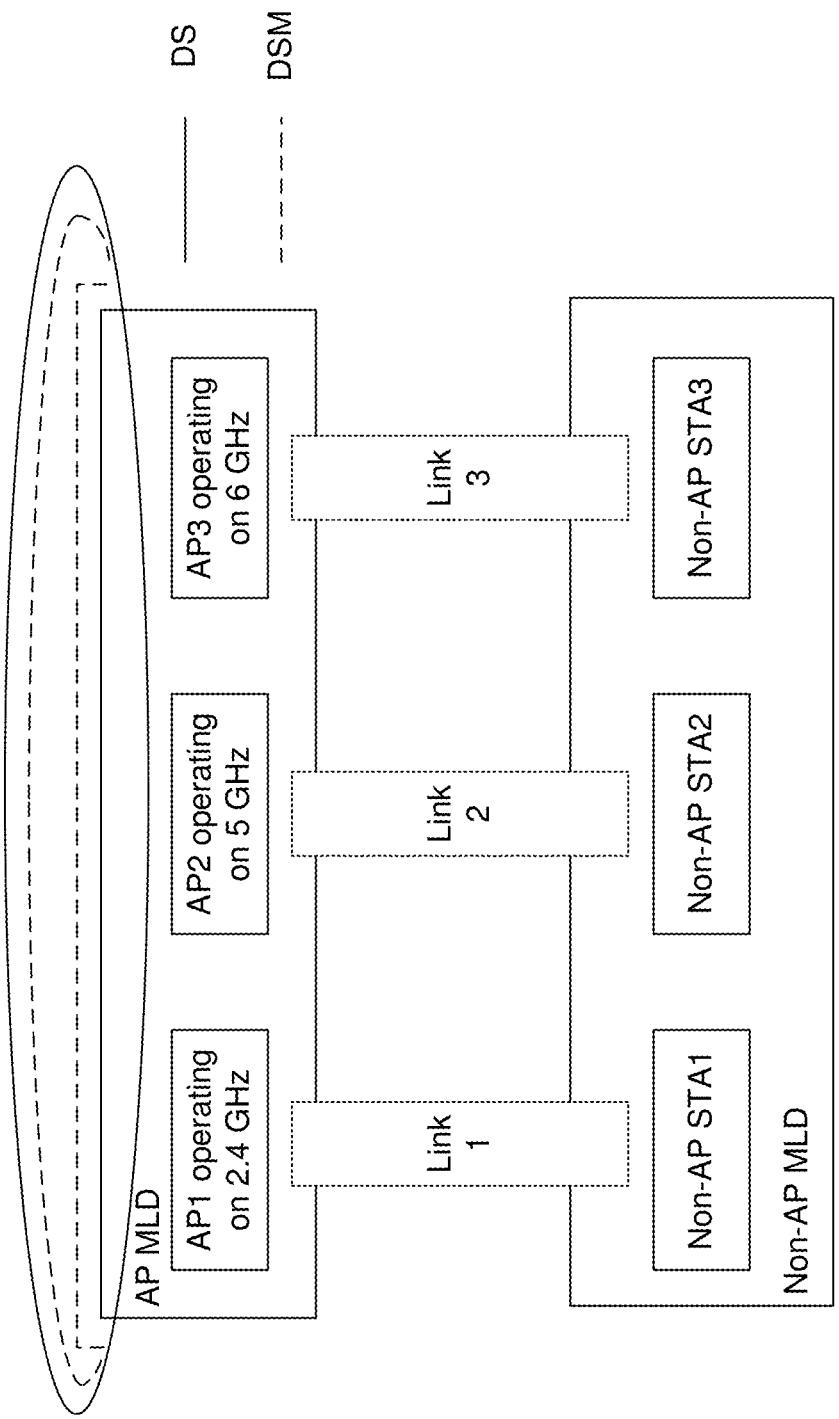
FIG. 1C depicts an illustrative schematic diagram for a multi-link device (MLD) between AP with logical entities and a non-AP with logical entities, in accordance with one or more example embodiments of the present disclosure.

FIG. 1C depicts an illustrative schematic diagram for an AP MLD and a non-AP MLD, in accordance with one or more example embodiments of the present disclosure.

Referring to FIG. 1C, there are shown two MLDs on either side which includes multiple STAs that can set up links with each other. For infrastructure framework, the AP MLD may include APs (e.g., AP1, AP2, and AP3) on one side, and the non-AP MLD may include non-AP STAs (STA1, STA2, and STA3) on the other side. The detailed definition is shown below. AP MLD is a multi-link logical entity, where each STA within the MLD is an EHT AP. Non-AP MLD is a multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 1C, the AP MLD and non-AP MLD may be two separate physical devices, where each one comprises a number of virtual or logical devices. For example, the AP MLD may comprise three APs, AP1 operating on 2.4 GHz, AP2 operating on 5 GHz, and AP3 operating on 6 GHz. Further, the non-AP MLD may comprise three non-AP STAs, STA1 communicating with AP1 on link 1, STA2 communicating with AP2 on link 2, and STA3 communicating with AP3 on link 3. It should be understood that these are only examples and that more or less entities may be included in an MLD.

The AP MLD is shown in FIG. 1C to have access to a distribution system (DS), which is a system used to interconnect a set of BSSs to create an extended service set (ESS). The AP MLD is also shown in FIG. 1C to have access a distribution system medium (DSM), which is the medium used by a DS for BSS interconnections. Simply put, DS and DSM allow the AP MLD to communicate with different BSSs.

It should be understood that although the example shows three logical entities within the AP MLD and the three logical entities within the non-AP MLD, this is merely for illustration purposes and that other numbers of logical entities with each of the AP MLD and non-AP MLD may be envisioned.

Figure 2:
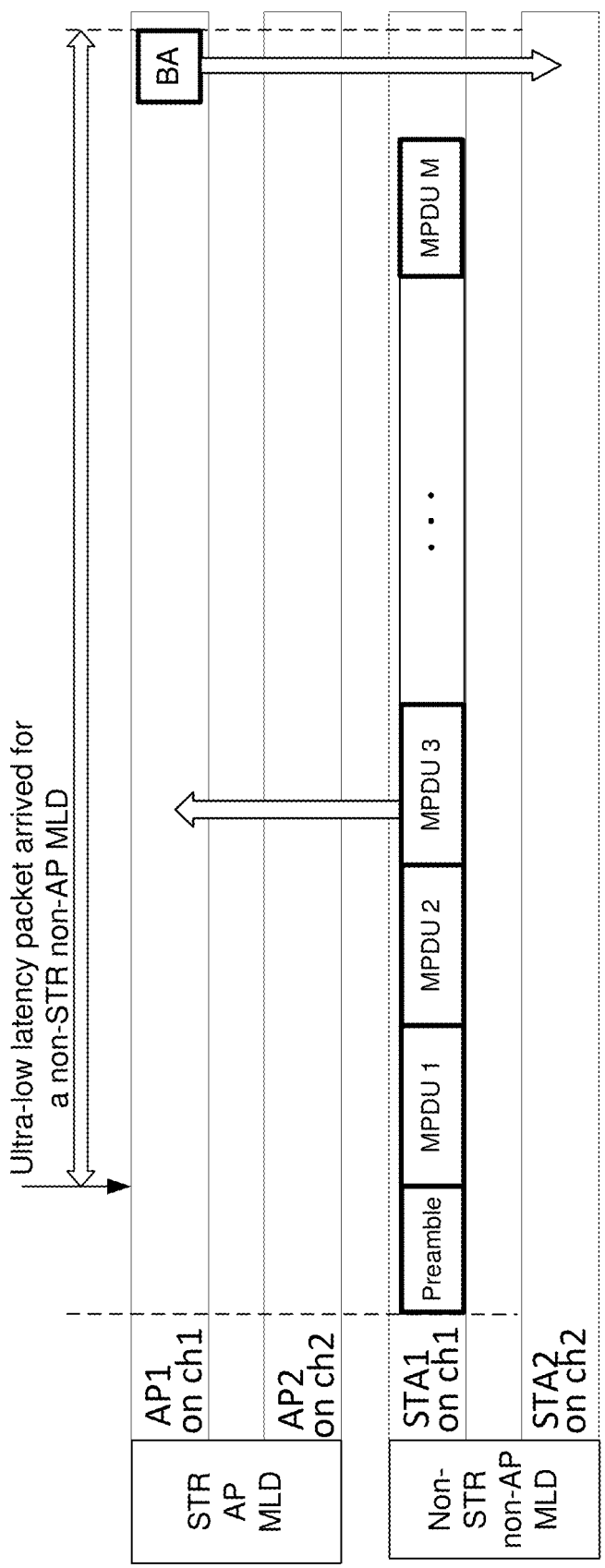
FIG. 2 depicts an illustrative schematic diagram for latency reduction, in accordance with one or more example embodiments of the present disclosure.

FIG. 2 depicts an illustrative schematic diagram for an ultra-low latency packet, in accordance with one or more example embodiments of the present disclosure.

Referring to FIG. 2, there is shown an ultra-low latency packet cannot be transmitted during an uplink transmission from a STA of a non-AP MLD.

As shown in the following FIG. 2, while a STA of a non-STR non-AP MLD, such as STA1, is sending an uplink data packet to the AP of an AP MLD over one of the operation channels, such as channel 1, a time-critical packet may arrive at the AP MLD for the non-AP MLD. Even though AP2 of the AP MLD is able to access another operation channel, channel 2, and send the time-critical packet to STA2, it is impossible for STA2 to decode the downlink packet successfully due to large self-interference (interference power could be as large as −13 dBm) that is generated from the uplink transmission from STA1 to the AP1 over channel 1. Therefore, the time-critical packet can only be transmitted to the non-AP MLD after the completion of the current uplink transmission with a long TXOP length (e.g., 5 milliseconds).

In one or more embodiments, a latency reduction system may facilitate new mechanisms to solve this problem by using an interference mitigation technique such as the Zadoff-Chu sequence.

In one or more embodiments, a latency reduction system may facilitate that an AP MLD is a STR AP MLD, which can transmit and receive frames over multiple channels, such as channel 1 and channel 2, at the same time. It is assumed that a non-AP MLD is a non-STR non-AP MLD that is only able to transmit or receive frames over channel 1 and/or channel 2 at the same time and cannot transmit and receive frames over channel 1 and channel 2 simultaneously.

While the AP MLD is receiving an uplink packet from one of its non-STR non-AP MLD over channel 1, such as STA1, and a time-critical packet arrives at the AP MLD for the non-AP MLD, it will use the following two methods to send the time-critical packet to the non-AP MLD. It is understood that the above descriptions are for purposes of illustration and are not meant to be limiting.

Figure 3:
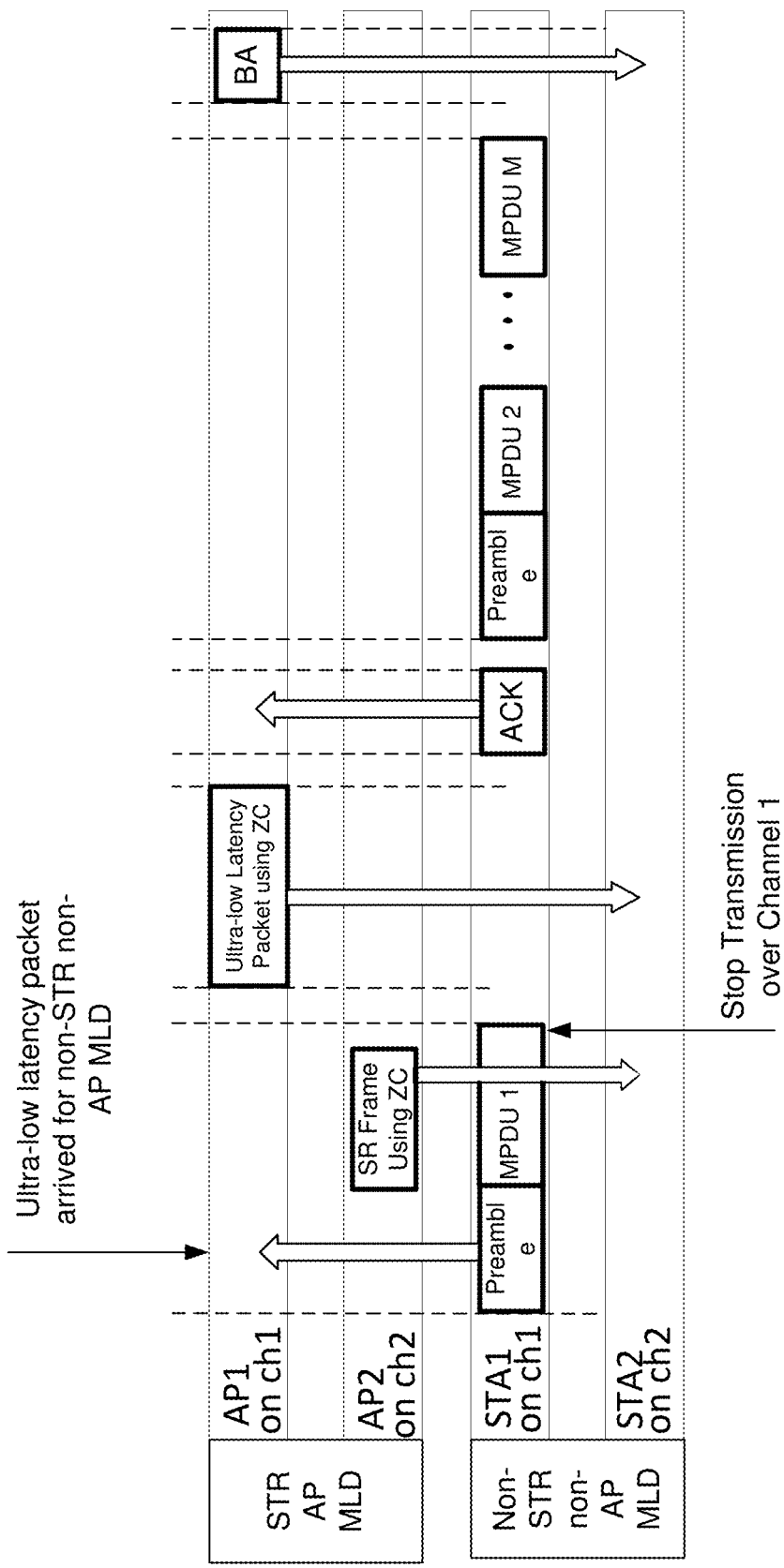
FIG. 3 depicts an illustrative schematic diagram for latency reduction, in accordance with one or more example embodiments of the present disclosure.

FIG. 3 depicts an illustrative schematic diagram for a control frame for latency reduction, in accordance with one or more example embodiments of the present disclosure.

Referring to FIG. 3, there is shown an SR (stop-request) control frame is encoded in a ZC sequence.

As shown in FIG. 3, the AP MLD sends a stop request (SR) control frame using a sequence, such as a ZC (Zadoff-Chu) sequence, that can mitigate interference from STA1 to STA2 of the non-AP MLD over channel 2. This SR control frame using the ZC sequence is used to indicate the receiver to stop the frame transmission (e.g., frame being comprised of a preamble a number of MAC protocol data units (MP-DUs)) on another channel, such as channel 1 in this example. This rule is pre-negotiated between the AP MLD and the non-AP MLD.

As a result, upon detection of the SR control frame on channel 2 with the ZC sequence which is assigned to STA1 by the AP MLD, STA1 of the non-AP MLD stops the current uplink transmission over channel 1. STA1 may stop the transmission after completing the current MPDU transmission.

Then, the AP1 of the AP MLD accesses channel 1 to send the time-critical packet (ultra-low latency packet) to STA1 of the non-AP MLD PIFS or SIFS time after the end of the current uplink transmission (e.g., MPDU1).

Upon reception of the time-critical packet from AP1, STA1 responds with an ACK frame and then continues the uplink transmission SIFS time after the transmission of the ACK frame as shown in FIG. 3.

It is understood that the above descriptions are for purposes of illustration and are not meant to be limiting.

Figure 4:
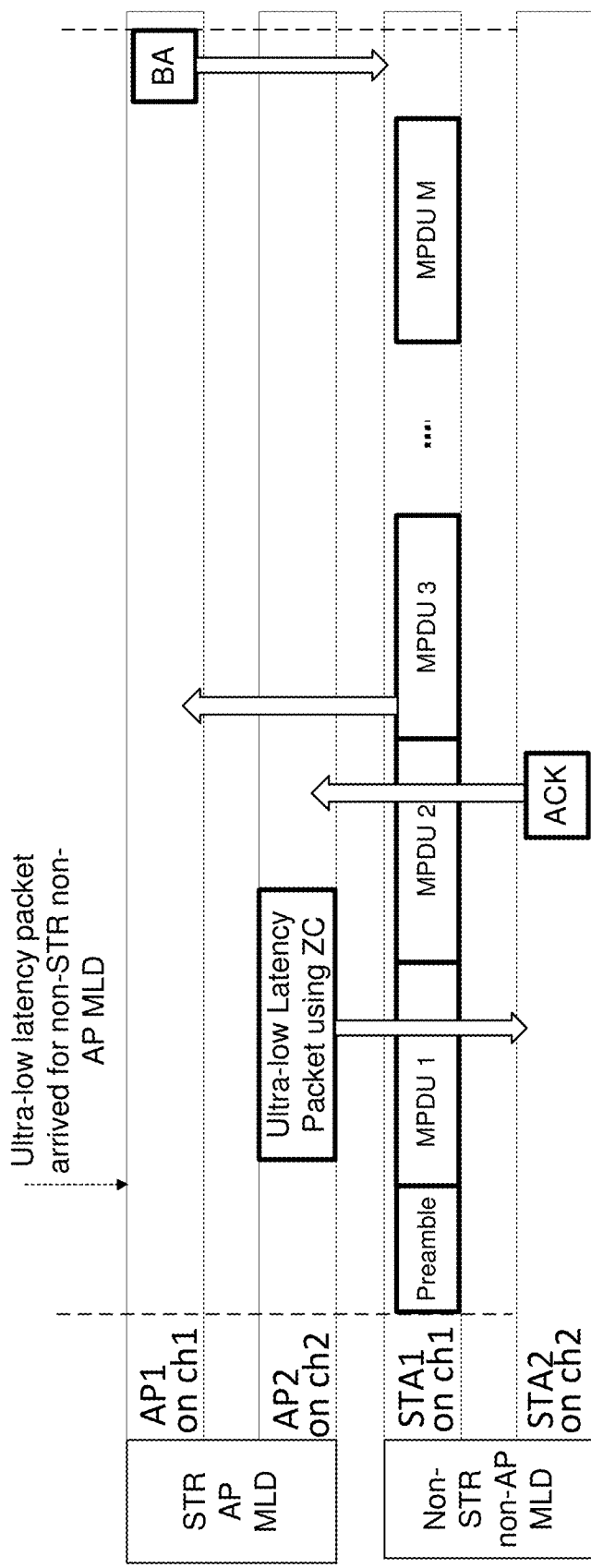

FIG. 4 depicts an illustrative schematic diagram for an ultra-low latency packet, in accordance with one or more example embodiments of the present disclosure.

Referring to FIG. 4, there is shown an ultra-low latency packet is encoded using a ZC sequence.

As shown in FIG. 4, instead of transmitting a SR control frame using a ZC sequence as shown in Method 1, AP2 of the AP MLD sends the short time-critical packet encoded using a ZC sequence to STA2 over channel 2. Upon the reception of the downlink time-critical packet from AP2 using a ZC sequence, STA2 responds with an acknowledgment to AP2.

To reduce power consumption for the ZC detection, a STA may only turn on the detection block periodically for a fixed time period while the STA is sending uplink data to the AP over another channel.

A ZC sequence of length N with root, $\mu$, is defined as:

$$z_0 = \begin{bmatrix} z_0 \\ z_1 \\ \vdots \\ z_{N-1} \end{bmatrix}, \text{with}$$

$$z_i = e^{\frac{j\mu\pi i^2}{N}} \text{ for } i = 0, 1, \ldots, N-1$$

In multi-user case, each non-STR non-AP MLD can be assigned a ZC sequence of length N with same root, $\mu$, but different shift $\Delta$, $z_\Delta$, defined as:

$$z_{\Delta=1} = \begin{bmatrix} z_{N-1} \\ z_0 \\ z_1 \\ \vdots \\ z_{N-2} \end{bmatrix}, z_{\Delta=1} = \begin{bmatrix} z_{N-2} \\ z_{N-1} \\ z_0 \\ \vdots \\ z_{N-3} \end{bmatrix}, z_{\Delta=N-1} = \begin{bmatrix} z_1 \\ z_2 \\ z_3 \\ \vdots \\ z_0 \end{bmatrix}$$

The orthogonal property between $z_i$ and $z_j$ with different shifts enables the receiver to identify whether the ZC sequence signal is for it or not.

$$z_i^H z_j = \begin{cases} 1, i = j \\ 0, i \neq j \end{cases}$$

However, to avoid interference between the multi-users, the shift $\Delta$ among different users should be large enough to mitigate the effect from the delay spread.

It is understood that the above descriptions are for purposes of illustration and are not meant to be limiting.

Figure 5:
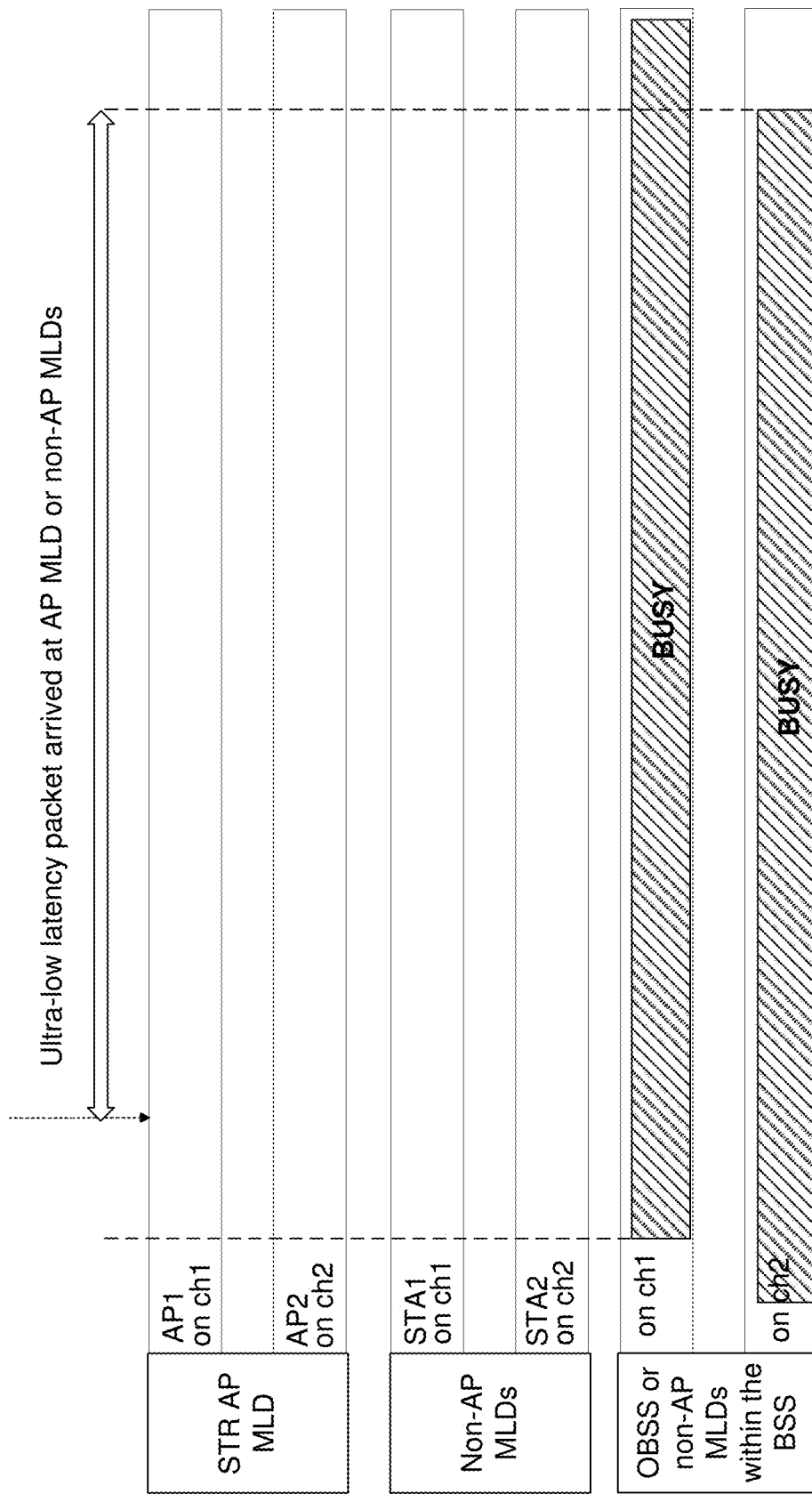
FIG. 5 depicts an illustrative schematic diagram for latency reduction, in accordance with one or more example embodiments of the present disclosure.

FIG. 5 depicts an illustrative schematic diagram for latency reduction, in accordance with one or more example embodiments of the present disclosure.

As shown in FIG. 5, while the channel is occupied by other STAs within the BSS or OBSS STAs, the STR AP MLD, the STR STA MLD or non-STR STA MLD are not able to access any channel or empty any channel for the time-critical packet transmission.

In one or more embodiments, a latency reduction system may facilitate new mechanisms to solve the problem while the channel is occupied by OBSS or non-AP MLDs within the same BSS through using an interface mitigation technique such as the Zadoff-Chu sequence. Note: this approach can also be used in the non-802.11be devices as long as it supports ultra-low latency (ULL) packet generation and detection using ZC sequence.

It is assumed that the AP MLD or the non-AP MLD those having time-critical applications have the Zadoff Chu sequence generation and detection capability.

To reduce power consumption for the ZC detection, a STA may only turn on the detection block periodically for a fixed time period while the STA is aware of ongoing long TXOP data transmission, which is not for it.

It is understood that the above descriptions are for purposes of illustration and are not meant to be limiting.

Figure 6:
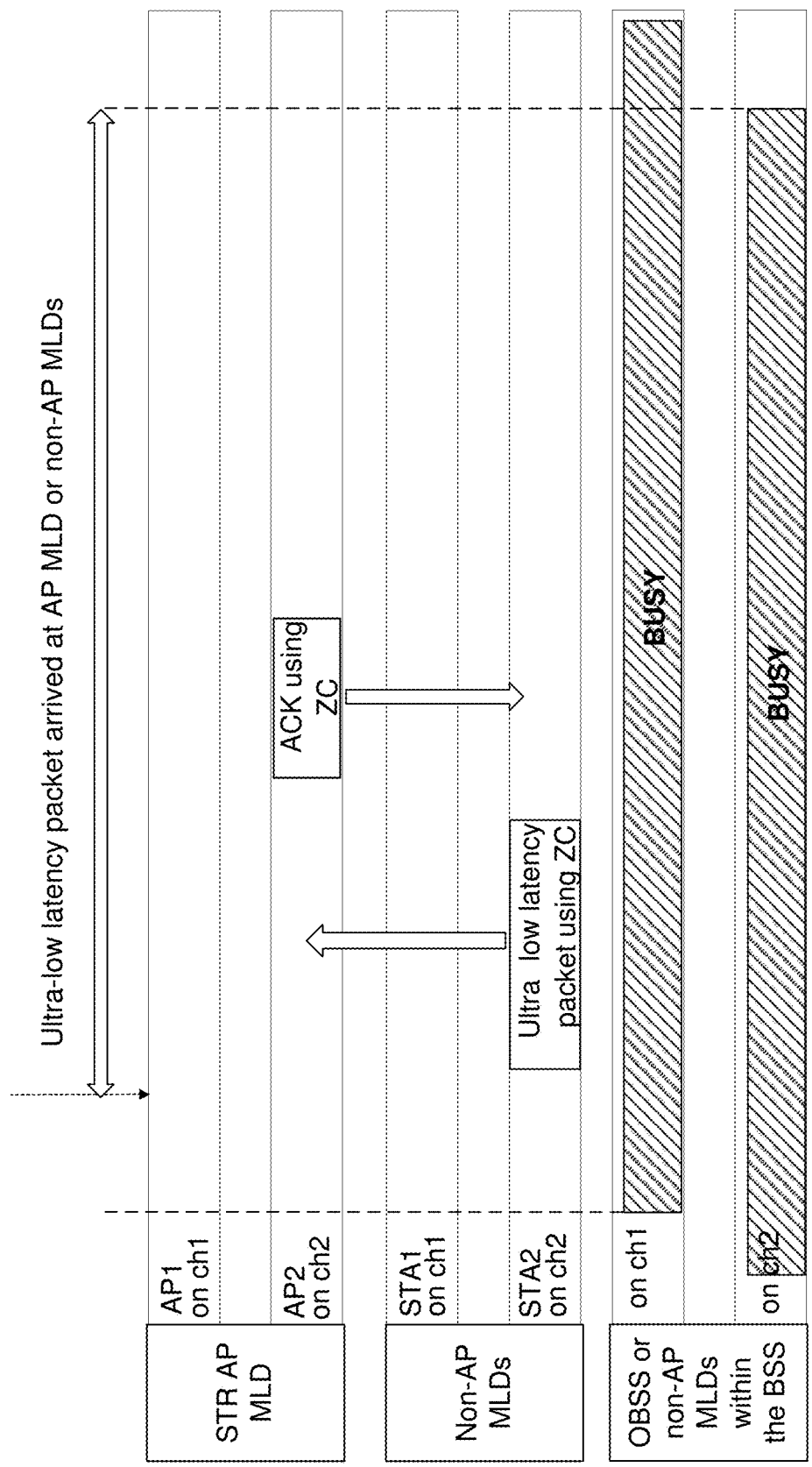
FIG. 6 depicts an illustrative schematic diagram for latency reduction, in accordance with one or more example embodiments of the present disclosure.

FIG. 6 depicts an illustrative schematic diagram for latency reduction, in accordance with one or more example embodiments of the present disclosure.

As shown in FIG. 6, while all the operation channels are occupied by the OBSS devices or another device within the BSS and a time-critical packet arrives at the AP MLD or non-AP MLD, the AP MLD or non-AP MLD will send the time-critical packet using ZC sequence to the non-AP MLD or the AP MLD over the operation channel for ZC sequence detection. It is understood that the above descriptions are for purposes of illustration and are not meant to be limiting.

Figure 7:
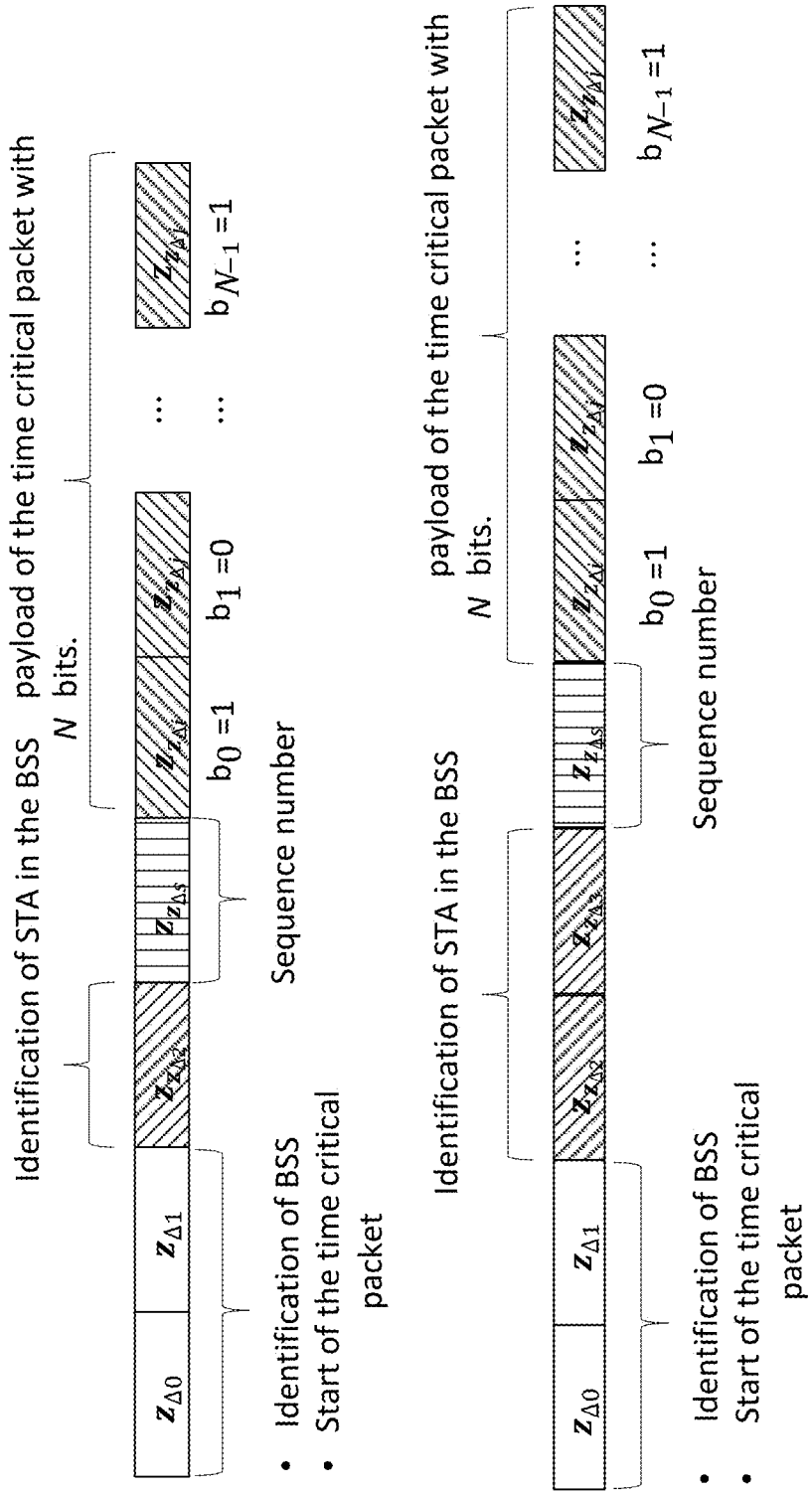
FIG. 7 depicts an illustrative schematic diagram for latency reduction, in accordance with one or more example embodiments of the present disclosure.

FIG. 7 depicts an illustrative schematic diagram for a design of a time-critical packet, in accordance with one or more example embodiments of the present disclosure.

Referring to FIG. 7, there is shown a design of a time-critical packet.

$z_{\Delta_0}$ and $z_{\Delta_1}$ are defined with a fixed shift in the same BSS used to identify different BSS and packet acquisition of the time-critical packet sent using ZC sequence. It can be reused in non-overlapping BSS. If two neighbor BSSs operating at the same channel, $z_{\Delta_0}$ and $z_{\Delta_1}$ with different shifts or different root values should be used to identify whether it is sent from the current BSS or not.

$z_{\Delta_2}$ and $z_{\Delta_3}$ are used to identify different users in the same BSS. If the number of users in the same BSS is small, a single ZC sequence $z_{\Delta_2}$ with different shifts will be used to identify different users in the same BSS. If the number of users in the same BSS is large and cannot be supported by a single ZC sequence, two or more ZC sequences with shifts can be used to support more users.

For the non-AP MLD or AP MLD, while detecting the first two ZC sequences as $z_{\Delta_0}$ and $z_{\Delta_1}$, and the third (and fourth) ZC sequence as $z_{\Delta_2}$ (and $z_{\Delta_3}$), which is assigned for this non-AP MLD, indicates the starting of the time-critical packet from or to this non-AP MLD.

The ZC sequence following $z_{\Delta_2}$ and $z_{\Delta_3}$, $z_{\Delta_s}$ is used to indicate the sequence number of the transmitted packet. For example, $z_{\Delta_s}$ with $\Delta_s$ the shift means that the sequence number for the current packet is $\Delta_s$. Note, it can be extended to two ZC sequences for a larger range of sequence numbers. However, it needs to be predefined in the network as the identification of the STA in the BSS with a single ZC sequence or two or more ZC sequences.

The payload following $z_{\Delta_s}$ is generated with $z_{\Delta_i}$ and $z_{\Delta_j}$. Each bit of the payload will be defined as:

$$b_i = \begin{cases} 1, z_{\Delta_i} \text{ is sent over this symbol} \\ 0, z_{\Delta_j} \text{ is sent over this symbol} \end{cases}$$

$z_{\Delta_i}$ and $z_{\Delta_j}$ are predefined by the AP and known to all the STAs. Therefore, all the STAs and AP are able to decode the payload.

This approach can also be used in the non-802.11be devices as long as the device supports ULL packet generation and detection using ZC sequence. It is understood that the above descriptions are for purposes of illustration and are not meant to be limiting.

Figure 8:
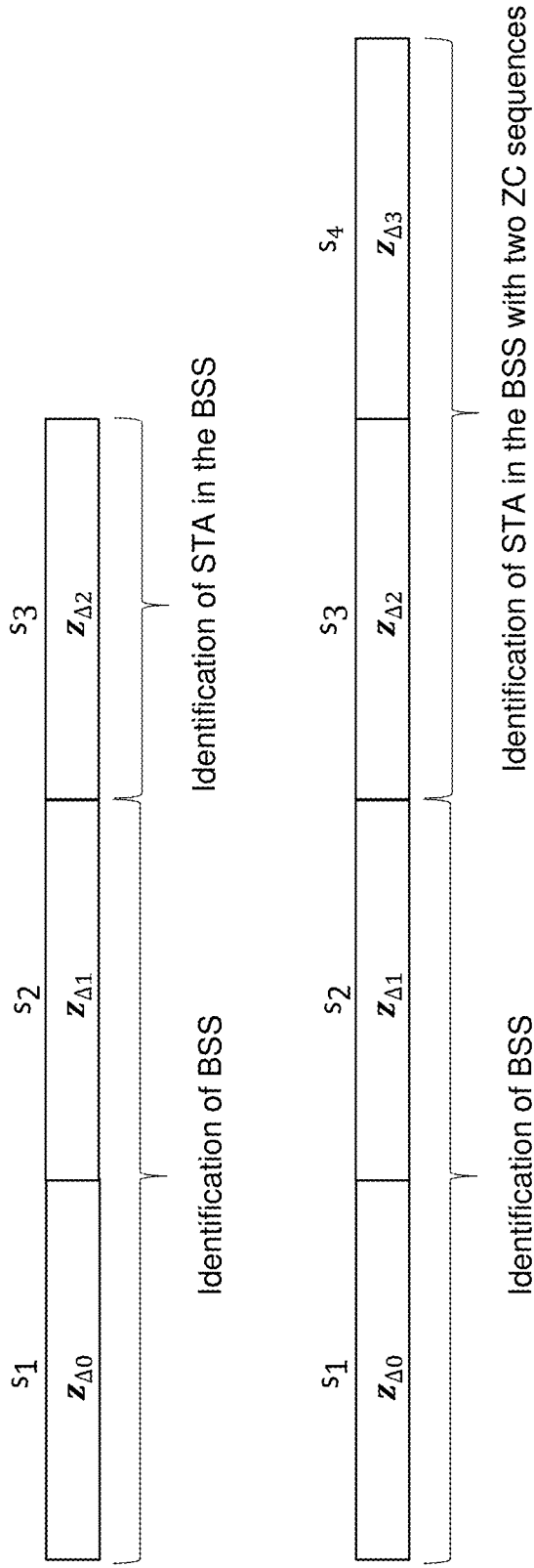
FIG. 8 depicts an illustrative schematic diagram for latency reduction, in accordance with one or more example embodiments of the present disclosure.

FIG. 8 depicts an illustrative schematic diagram for latency reduction, in accordance with one or more example embodiments of the present disclosure.

Referring to FIG. 8, there is shown scheduling request signal format using ZC sequences.

Scheduling request signal generated with ZC sequence can be reused in the Wi-Fi to support low latency applications.

The scheduling request signal will be generated with two extra ZC sequences with fixed shift for all the STAs in the same BSS and following a single or more than two ZC sequences with different shifts for each STA as shown in FIG. 8, where, $z_{\Delta_0}$ and $z_{\Delta_1}$ are defined with a fixed shift in the same BSS used to identify different BSS and packet acquisition of the scheduling request signal. It can be reused in non-overlapping BSS. If two neighbor BSSs operating at the same channel, $z_{\Delta_0}$ and $z_{\Delta_1}$ with different shifts or different root values should be used.

$z_{\Delta_2}$ and $z_{\Delta_3}$ are used to identify different users in the same BSS. If the number of users in the same BSS is small, a single ZC sequence $z_{\Delta_2}$ with different shifts will be used to identify different users in the same BSS. If the number of users in the same BSS is large and cannot be supported by a single ZC sequence, two or more ZC sequences with shifts can be used to support more users. But this needs to be pre-defined and known to both the AP and STAs.

Note, the more ZC sequences following the two fixed ZC sequences are used to generate SR signal for each user, the better detection performance can be achieved especially under challenging channel conditions with severe interference, but it is at the cost of higher detection complexity. Therefore, while the number of STAs in the BSS is small, the scheduling request signal generated with $z_{\Delta_0}$, $z_{\Delta_1}$ and $z_{\Delta_2}$, which can support up to N STAs in the BSS, may be is a better choice in terms of the detection complexity. However, the scheduling request signal generated with $z_{\Delta_0}$, $z_{\Delta_1}$, $z_{\Delta_2}$ and $z_{\Delta_4}$ or even more ZC sequences are required to improve the detection performance while facing bad channel condition or larger interference. Here N is the length of the ZC sequence.

Figure 9:
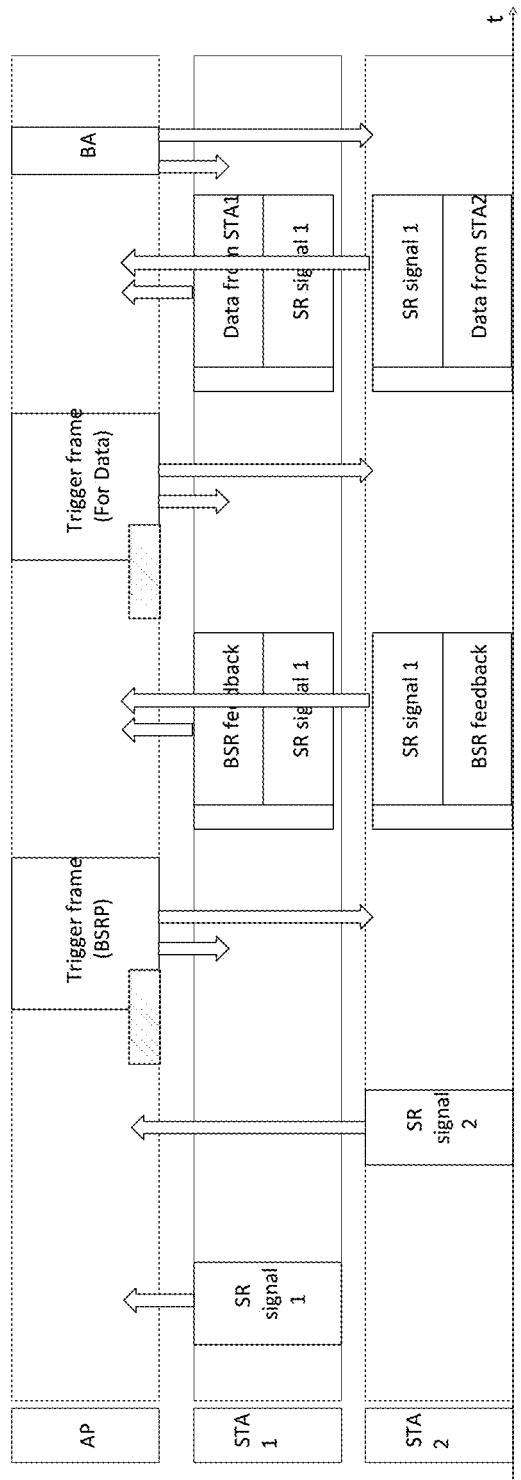
FIG. 9 depicts an illustrative schematic diagram for latency reduction, in accordance with one or more example embodiments of the present disclosure.

FIG. 9 depicts an illustrative schematic diagram for latency reduction, in accordance with one or more example embodiments of the present disclosure.

Referring to FIG. 9, there is shown uplink (UL) multi-user (MU) OFDMA transmission with a new SR signal design.

In an example, it is assumed that the AP has ZC sequence detection capability. Each STA in the same BSS will be assigned a unique scheduling request signal by the AP.

As shown in FIG. 9, while the STA1 or STA2 has a scheduling request, it will send the SR signal using the ZC sequence assigned for it. It can follow current 802.11 sensing before sending channel access policy or access the channel directly due to the negligible interference effect, which is only 3-4 OFDM symbols, to the ongoing normal Wi-Fi frame transmission.

Upon the detection of the scheduling request signal and identification of the transmitter, the AP will send a trigger fame to the related STAs to collect buffer status information for scheduling the following UL MU OFDMA data transmission. It is understood that the above descriptions are for purposes of illustration and are not meant to be limiting.

Figure 10:
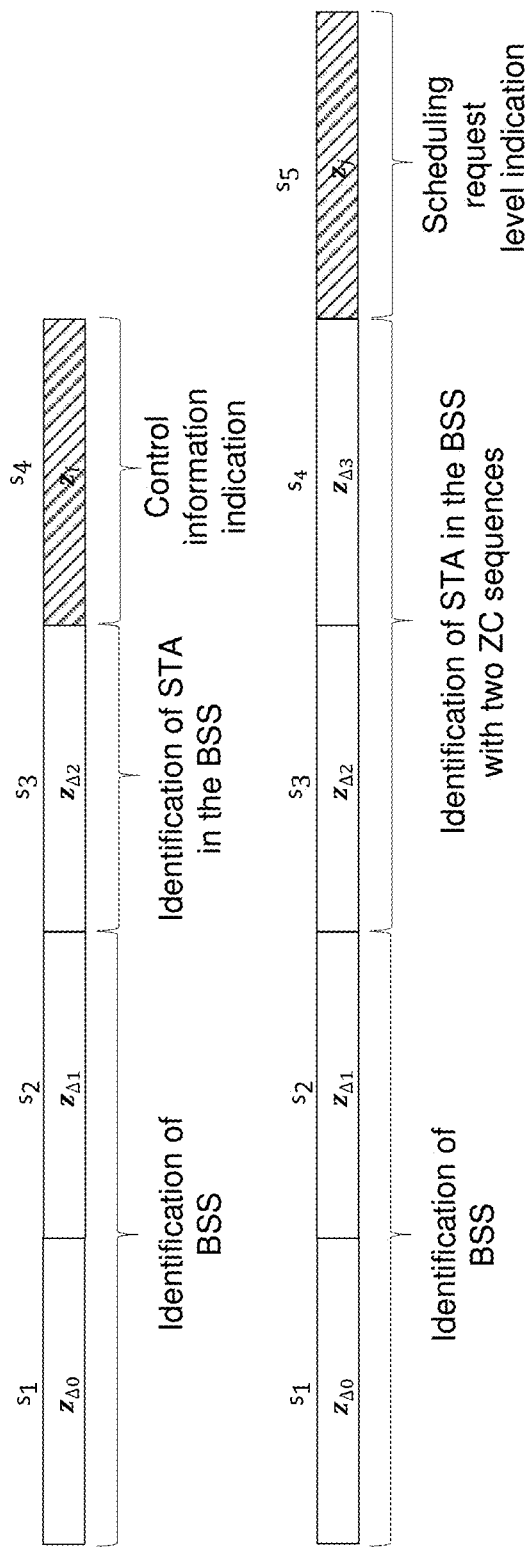
FIG. 10 depicts an illustrative schematic diagram for latency reduction, in accordance with one or more example embodiments of the present disclosure.

FIG. 10 depicts an illustrative schematic diagram for latency reduction, in accordance with one or more example embodiments of the present disclosure.

In one or more embodiments, an AP may use only SR signals received from STAs to schedule RUs without transmitting a BSRP Trigger frame. The AP may schedule a small RU to each STA from which it received a SR signal in a Basic Trigger frame to solicit uplink data frames. In the uplink data frames, the STAs may include a buffer status report. Based on the buffer status report in the uplink data frames, the AP schedules more accurate RUs to the STAs in the next Basic Trigger frame.

The SR signal may indicate different levels of scheduling requests for different STAs, it can be by pre-negotiation between the AP and the STA to set up the requested service flow characteristics, so the AP already knows how to schedule that specific STA. It can include one or several bits in the SR signal to indicate it needs to be scheduled for a single frame or some simple indication of the requested service. For example, if two levels are to be defined, which request to be scheduled directly or to be triggered for BSR. One extra ZC sequence can be used following the ZC sequence for identification of STA in the BSS to indicate the request as shown in FIG. 10. This can be differentiated with two ZC sequences with different shift values, such as $z_i$ and $z_j$, $i \neq j$.

AP should indicate whether it supports this feature or not in the beacon frame. STA should also indicate whether it supports this feature or not when it setups the association with the AP. The SR signal can also be transmitted on top of ongoing data transmission without contention. It is understood that the above descriptions are for purposes of illustration and are not meant to be limiting.

Figure 11:
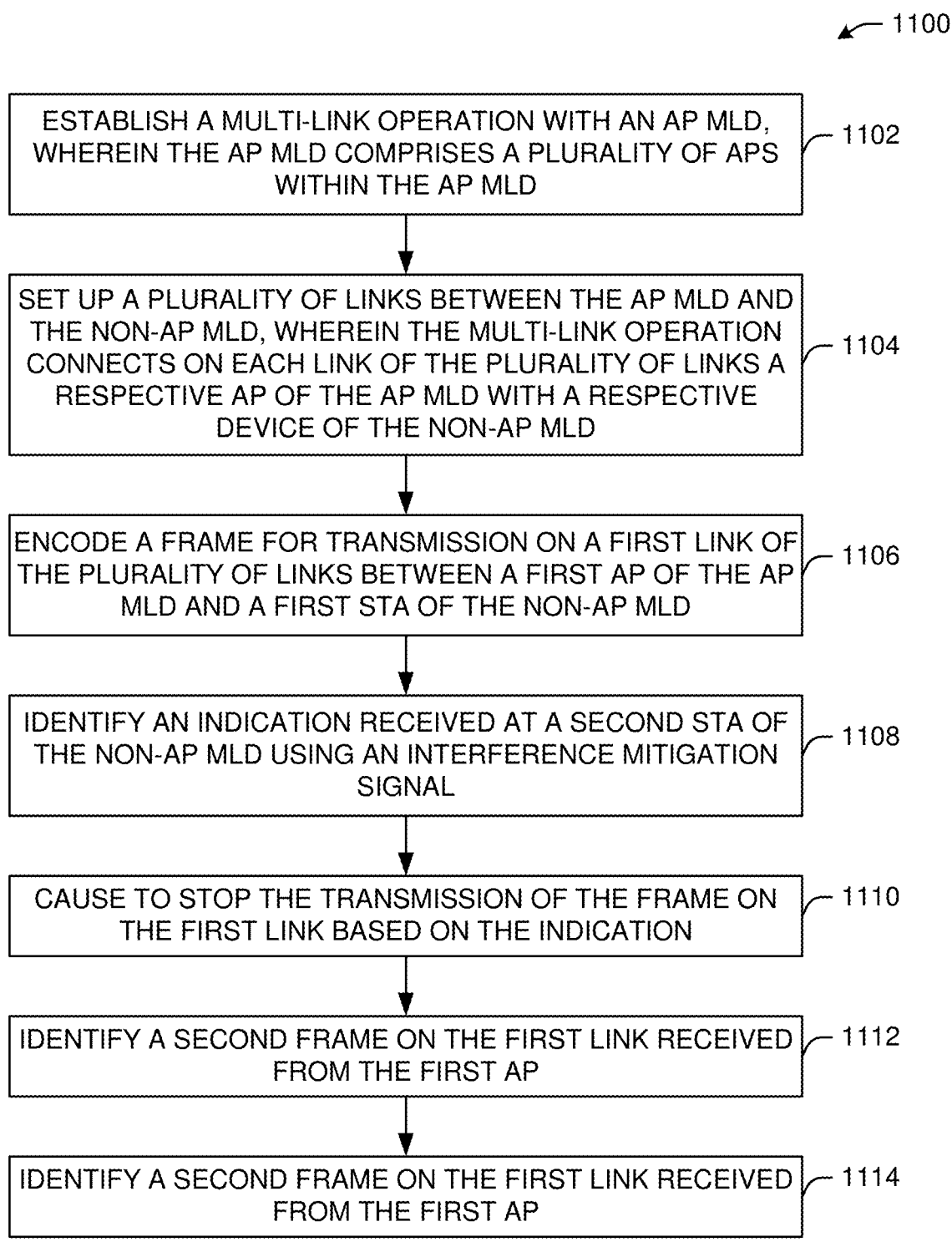
FIG. 11 illustrates a flow diagram of a process for an illustrative latency reduction system, in accordance with one or more example embodiments of the present disclosure.

FIG. 11 illustrates a flow diagram of illustrative process 1100 for a latency reduction system, in accordance with one or more example embodiments of the present disclosure.

At block 1102, a device (e.g., the user device(s) 120 and/or the AP 102 of FIG. 1A and/or the latency reduction device 1319 of FIG. 13) may establish a multi-link operation with an AP MLD, wherein the AP MLD comprises a plurality of APs within the AP MLD. The non-AP MLD is a non-simultaneous transmit receive (STR) device.

At block 1104, the device may set up a plurality of links between the AP MLD and the non-AP MLD, wherein the multi-link operation connects on each link of the plurality of links a respective AP of the AP MLD with a respective device of the non-AP MLD.

At block 1106, the device may encode a first frame for transmission on a first link of the plurality of links between a first AP of the AP MLD and a first STA of the non-AP MLD.

At block 1108, the device may identify an indication received at a second STA of the non-AP MLD using an interference mitigation signal. The first frame includes a first preamble and a number of medium access control (MAC) protocol data units (MPDUs). The indication includes a packet destined to the second STA on the second link. The packet is received on the second link without stopping transmission on the first link The indication is a stop request and wherein the interference mitigation signal is a Zadoff-Chu sequence (ZC) sequence. The ZC sequence has a characteristic of $z^i_H z_j = 0$, $i \neq j$.

At block 1110, the device may cause to stop the transmission of the frame on the first link based on the indication.

At block 1112, the device may identify a second frame on the first link received from the first AP.

At block 1114, the device may cause to resume the transmission of the first frame on the first link. Resuming the transmission includes adding a second preamble to remaining MPDUs of the first frame. The device may cause to send an acknowledgement to the second frame. The device may perform cross-correlation to determine that the stop request is assigned to the first STA.

It is understood that the above descriptions are for purposes of illustration and are not meant to be limiting.

FIG. 12 shows a functional diagram of an exemplary communication station 1200, in accordance with one or more example embodiments of the present disclosure. In one embodiment, FIG. 12 illustrates a functional block diagram of a communication station that may be suitable for use as an AP 102 (FIG. 1A) or a user device 120 (FIG. 1A) in accordance with some embodiments. The communication station 1200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1200 may include communications circuitry 1202 and a transceiver 1210 for transmitting and receiving signals to and from other communication stations using one or more antennas 1201. The communications circuitry 1202 may include circuitry that can operate the physical layer (PHY) communications and/or medium access control (MAC) communications for controlling access to the wireless medium, and/or any other communications layers for transmitting and receiving signals. The communication station 1200 may also include processing circuitry 1206 and memory 1208 arranged to perform the operations described herein. In some embodiments, the communications circuitry 1202 and the processing circuitry 1206 may be configured to perform operations detailed in the above figures, diagrams, and flows.

In accordance with some embodiments, the communications circuitry 1202 may be arranged to contend for a wireless medium and configure frames or packets for communicating over the wireless medium. The communications circuitry 1202 may be arranged to transmit and receive signals. The communications circuitry 1202 may also include circuitry for modulation/demodulation, upconversion/downconversion, filtering, amplification, etc. In some embodiments, the processing circuitry 1206 of the communication station 1200 may include one or more processors. In other embodiments, two or more antennas 1201 may be coupled to the communications circuitry 1202 arranged for sending and receiving signals. The memory 1208 may store information for configuring the processing circuitry 1206 to perform operations for configuring and transmitting message frames and performing the various operations described herein. The memory 1208 may include any type of memory, including non-transitory memory, for storing information in a form readable by a machine (e.g., a computer). For example, the memory 1208 may include a computer-readable storage device, read-only memory (ROM), random-access memory (RAM), magnetic disk storage media, optical storage media, flash-memory devices and other storage devices and media.

In some embodiments, the communication station 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1200 may include one or more antennas 1201. The antennas 1201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1200 may include one or more of a keyboard, a display, a non-volatile memory port, multiple antennas, a graphics processor, an application processor, speakers, and other mobile device elements. The display may be an LCD screen including a touch screen.

Although the communication station 1200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1200 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1200 may include one or more processors and may be configured with instructions stored on a computer-readable storage device.

FIG. 13 illustrates a block diagram of an example of a machine 1300 or system upon which any one or more of the techniques (e.g., methodologies) discussed herein may be performed. In other embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environments. The machine 1300 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a power management device 1332, a graphics display device 1310, an alphanumeric input device 1312 (e.g., a keyboard), and a user interface (UI) navigation device 1314 (e.g., a mouse). In an example, the graphics display device 1310, alphanumeric input device 1312, and UI navigation device 1314 may be a touch screen display. The machine 1300 may additionally include a storage device (i.e., drive unit) 1316, a signal generation device 1318 (e.g., a speaker), a latency reduction device 1319, a network interface device/transceiver 1320 coupled to antenna(s) 1330, and one or more sensors 1328, such as a global positioning system (GPS) sensor, a compass, an accelerometer, or other sensor. The machine 1300 may include an output controller 1334, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1302 for generation and processing of the baseband signals and for controlling operations of the main memory 1304, the storage device 1316, and/or the latency reduction device 1319. The baseband processor may be provided on a single radio card, a single chip, or an integrated circuit (IC).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, or within the hardware processor 1302 during execution thereof by the machine 1300. In an example, one or any combination of the hardware processor 1302, the main memory 1304, the static memory 1306, or the storage device 1316 may constitute machine-readable media.

The latency reduction device 1319 may carry out or perform any of the operations and processes (e.g., process 1100) described and shown above.

It is understood that the above are only a subset of what the latency reduction device 1319 may be configured to perform and that other functions included throughout this disclosure may also be performed by the latency reduction device 1319.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1300 and that cause the machine 1300 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device/transceiver 1320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, and peer-to-peer (P2P) networks, among others. In an example, the network interface device/transceiver 1320 may include one or more physical jacks (e.g., Ethernet, coaxial, or phone jacks) or one or more antennas to connect to the communications network 1326. In an example, the network interface device/transceiver 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1300 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 14:
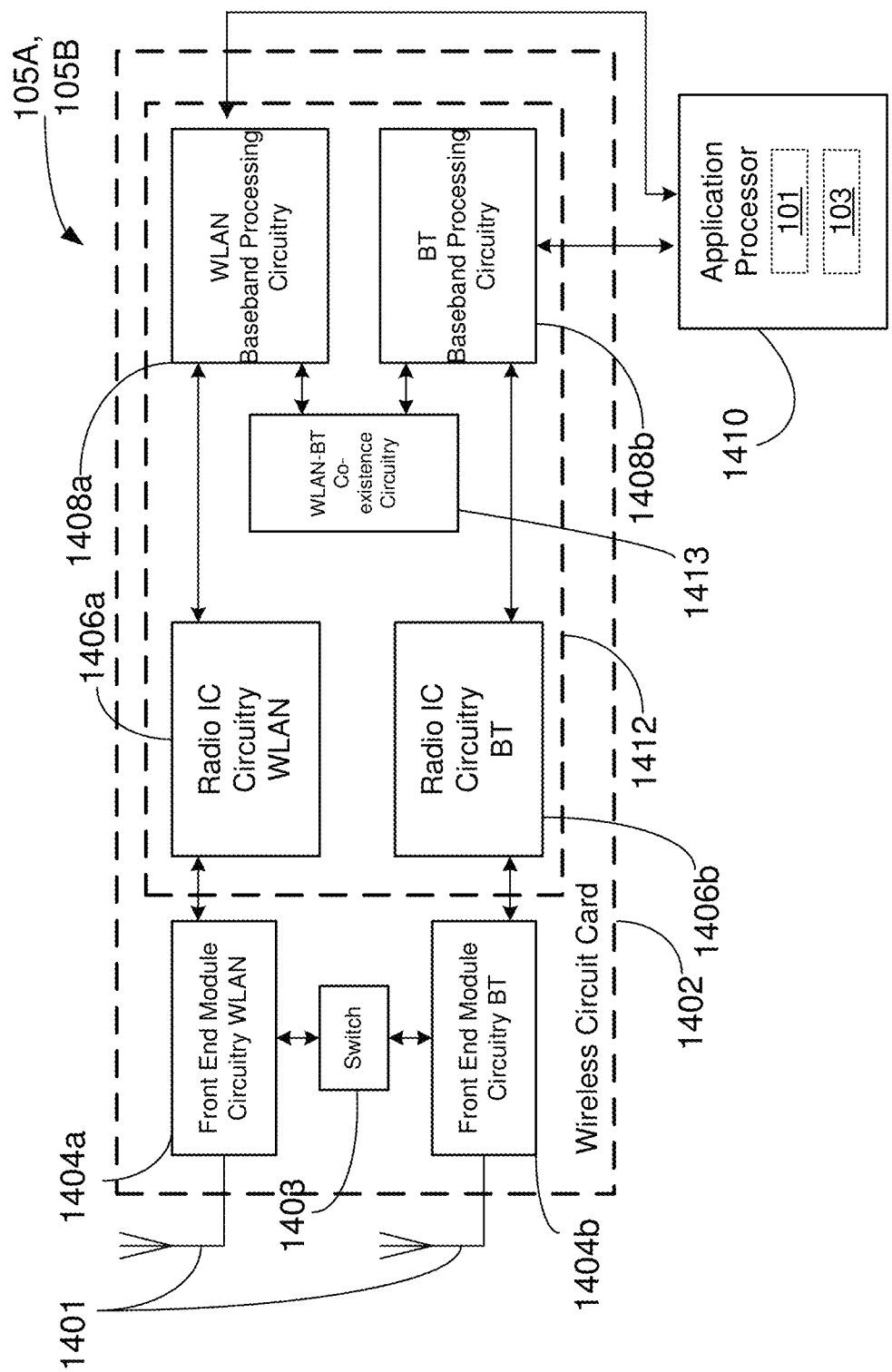
FIG. 14 is a block diagram of a radio architecture in accordance with some examples.

FIG. 14 is a block diagram of a radio architecture 105A, 105B in accordance with some embodiments that may be implemented in any one of the example APs 102 and/or the example STAs 120 of FIG. 1A. Radio architecture 105A, 105B may include radio front-end module (FEM) circuitry 1404a-b, radio IC circuitry 1406a-b and baseband processing circuitry 1408a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1404a-b may include a WLAN or Wi-Fi FEM circuitry 1404a and a Bluetooth (BT) FEM circuitry 1404b. The WLAN FEM circuitry 1404a may include a receive signal path comprising circuitry configured to operate on WLAN RF signals received from one or more antennas 1401, to amplify the received signals and to provide the amplified versions of the received signals to the WLAN radio IC circuitry 1406a for further processing. The BT FEM circuitry 1404b may include a receive signal path which may include circuitry configured to operate on BT RF signals received from one or more antennas 1401, to amplify the received signals and to provide the amplified versions of the received signals to the BT radio IC circuitry 1406b for further processing. FEM circuitry 1404a may also include a transmit signal path which may include circuitry configured to amplify WLAN signals provided by the radio IC circuitry 1406a for wireless transmission by one or more of the antennas 1401. In addition, FEM circuitry 1404b may also include a transmit signal path which may include circuitry configured to amplify BT signals provided by the radio IC circuitry 1406b for wireless transmission by the one or more antennas. In the embodiment of FIG. 14, although FEM 1404a and FEM 1404b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1406a-b as shown may include WLAN radio IC circuitry 1406a and BT radio IC circuitry 1406b. The WLAN radio IC circuitry 1406a may include a receive signal path which may include circuitry to down-convert WLAN RF signals received from the FEM circuitry 1404a and provide baseband signals to WLAN baseband processing circuitry 1408a. BT radio IC circuitry 1406b may in turn include a receive signal path which may include circuitry to down-convert BT RF signals received from the FEM circuitry 1404b and provide baseband signals to BT baseband processing circuitry 1408b. WLAN radio IC circuitry 1406a may also include a transmit signal path which may include circuitry to up-convert WLAN baseband signals provided by the WLAN baseband processing circuitry 1408a and provide WLAN RF output signals to the FEM circuitry 1404a for subsequent wireless transmission by the one or more antennas 1401. BT radio IC circuitry 1406b may also include a transmit signal path which may include circuitry to up-convert BT baseband signals provided by the BT baseband processing circuitry 1408b and provide BT RF output signals to the FEM circuitry 1404b for subsequent wireless transmission by the one or more antennas 1401. In the embodiment of FIG. 14, although radio IC circuitries 1406a and 1406b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1408a-b may include a WLAN baseband processing circuitry 1408a and a BT baseband processing circuitry 1408b. The WLAN baseband processing circuitry 1408a may include a memory, such as, for example, a set of RAM arrays in a Fast Fourier Transform or Inverse Fast Fourier Transform block (not shown) of the WLAN baseband processing circuitry 1408a. Each of the WLAN baseband circuitry 1408a and the BT baseband circuitry 1408b may further include one or more processors and control logic to process the signals received from the corresponding WLAN or BT receive signal path of the radio IC circuitry 1406a-b, and to also generate corresponding WLAN or BT baseband signals for the transmit signal path of the radio IC circuitry 1406a-b. Each of the baseband processing circuitries 1408a and 1408b may further include physical layer (PHY) and medium access control layer (MAC) circuitry, and may further interface with a device for generation and processing of the baseband signals and for controlling operations of the radio IC circuitry 1406a-b.

Referring still to FIG. 14, according to the shown embodiment, WLAN-BT coexistence circuitry 1413 may include logic providing an interface between the WLAN baseband circuitry 1408a and the BT baseband circuitry 1408b to enable use cases requiring WLAN and BT coexistence. In addition, a switch 1403 may be provided between the WLAN FEM circuitry 1404a and the BT FEM circuitry 1404b to allow switching between the WLAN and BT radios according to application needs. In addition, although the antennas 1401 are depicted as being respectively connected to the WLAN FEM circuitry 1404a and the BT FEM circuitry 1404b, embodiments include within their scope the sharing of one or more antennas as between the WLAN and BT FEMs, or the provision of more than one antenna connected to each of FEM 1404a or 1404b.

In some embodiments, the front-end module circuitry 1404a-b, the radio IC circuitry 1406a-b, and baseband processing circuitry 1408a-b may be provided on a single radio card, such as wireless radio card 1402. In some other embodiments, the one or more antennas 1401, the FEM circuitry 1404a-b and the radio IC circuitry 1406a-b may be provided on a single radio card. In some other embodiments, the radio IC circuitry 1406a-b and the baseband processing circuitry 1408a-b may be provided on a single chip or integrated circuit (IC), such as IC 1412.

In some embodiments, the wireless radio card 1402 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1408b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 15:
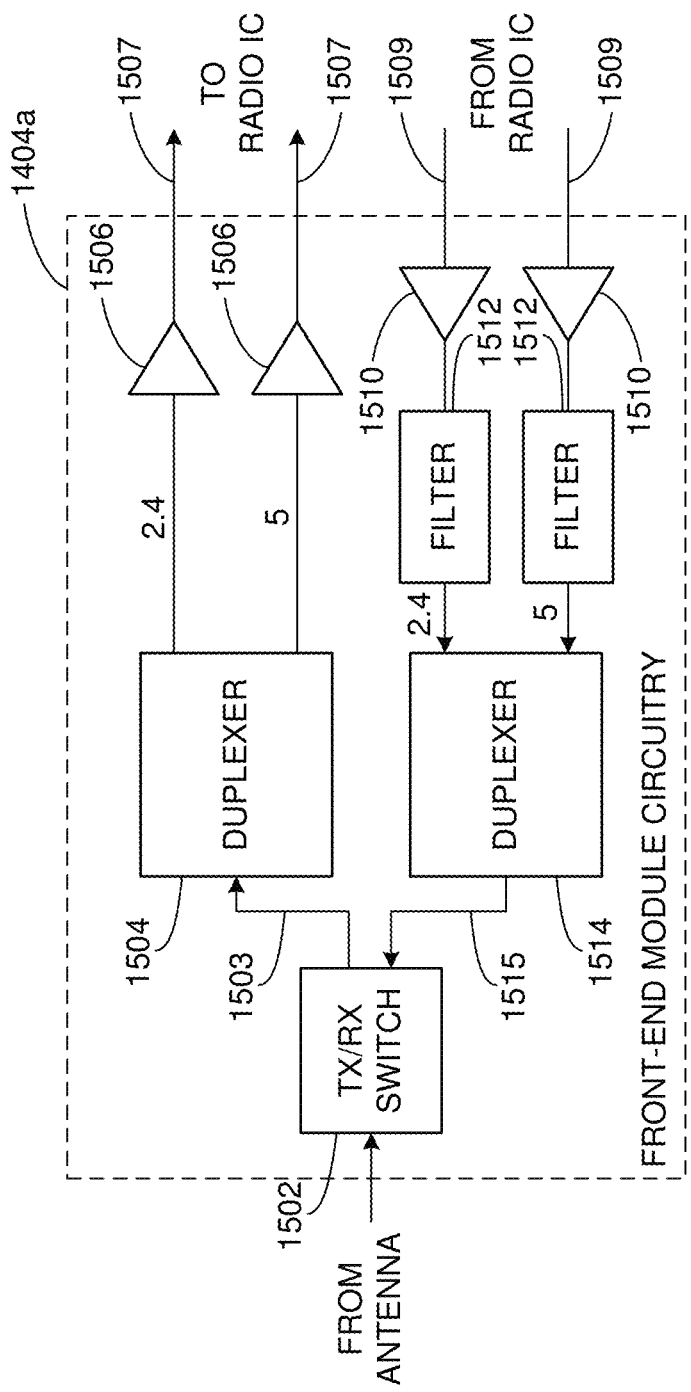
FIG. 15 illustrates an example front-end module circuitry for use in the radio architecture of FIG. 14, in accordance with one or more example embodiments of the present disclosure.

FIG. 15 illustrates WLAN FEM circuitry 1404a in accordance with some embodiments. Although the example of FIG. 15 is described in conjunction with the WLAN FEM circuitry 1404a, the example of FIG. 15 may be described in conjunction with the example BT FEM circuitry 1404b (FIG. 14), although other circuitry configurations may also be suitable.

In some embodiments, the FEM circuitry 1404a may include a TX/RX switch 1502 to switch between transmit mode and receive mode operation. The FEM circuitry 1404a may include a receive signal path and a transmit signal path. The receive signal path of the FEM circuitry 1404a may include a low-noise amplifier (LNA) 1506 to amplify received RF signals 1503 and provide the amplified received RF signals 1507 as an output (e.g., to the radio IC circuitry 1406a-b (FIG. 14)). The transmit signal path of the circuitry 1404a may include a power amplifier (PA) to amplify input RF signals 1509 (e.g., provided by the radio IC circuitry 1406a-b), and one or more filters 1512, such as band-pass filters (BPFs), low-pass filters (LPFs) or other types of filters, to generate RF signals 1515 for subsequent transmission (e.g., by one or more of the antennas 1401 (FIG. 14)) via an example duplexer 1514.

In some dual-mode embodiments for Wi-Fi communication, the FEM circuitry 1404*a* may be configured to operate in either the 2.4 GHz frequency spectrum or the 5 GHz frequency spectrum. In these embodiments, the receive signal path of the FEM circuitry 1404*a* may include a receive signal path duplexer 1504 to separate the signals from each spectrum as well as provide a separate LNA 1506 for each spectrum as shown. In these embodiments, the transmit signal path of the FEM circuitry 1404*a* may also include a power amplifier 1510 and a filter 1512, such as a BPF, an LPF or another type of filter for each frequency spectrum and a transmit signal path duplexer 1504 to provide the signals of one of the different spectrums onto a single transmit path for subsequent transmission by the one or more of the antennas 1401 (FIG. 14). In some embodiments, BT communications may utilize the 2.4 GHz signal paths and may utilize the same FEM circuitry 1404*a* as the one used for WLAN communications.

Figure 16:
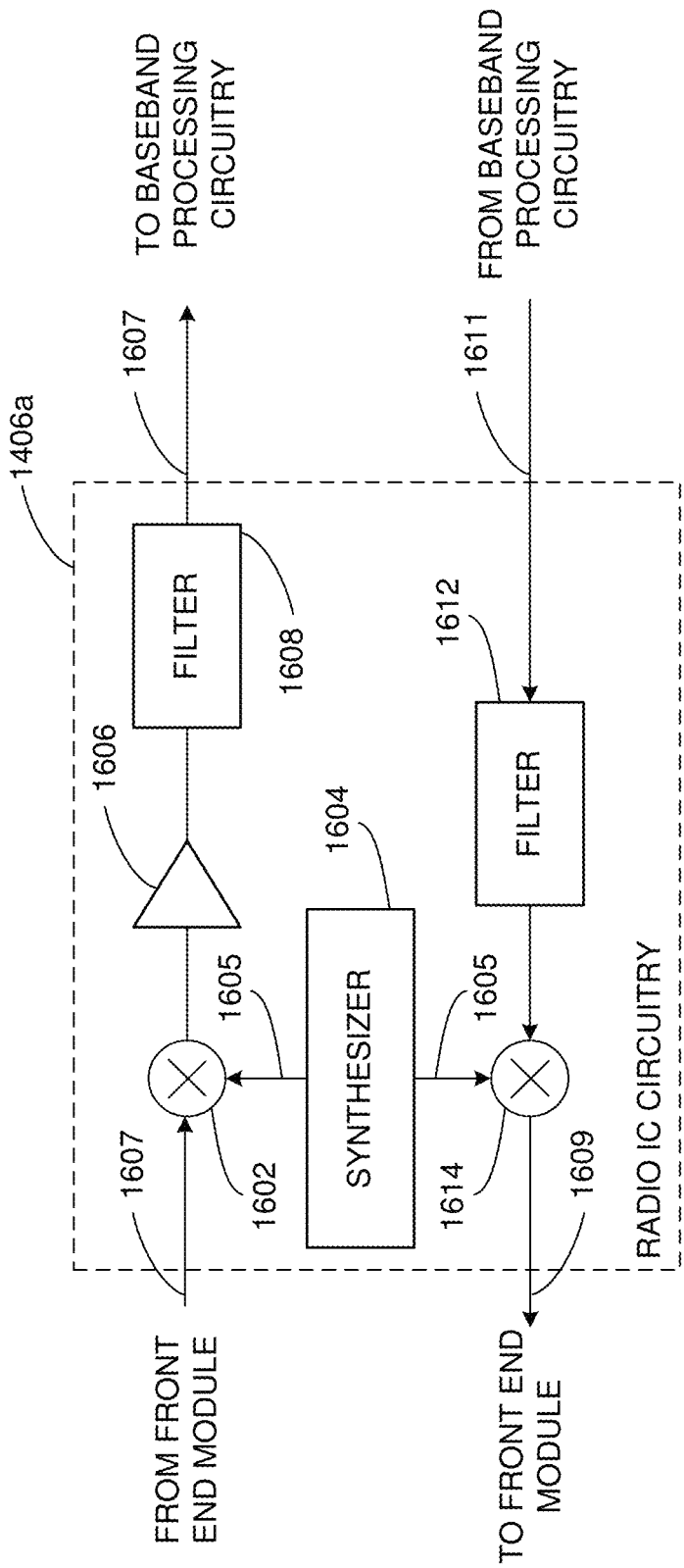
FIG. 16 illustrates an example radio IC circuitry for use in the radio architecture of FIG. 14, in accordance with one or more example embodiments of the present disclosure.

FIG. 16 illustrates radio IC circuitry 1406*a* in accordance with some embodiments. The radio IC circuitry 1406*a* is one example of circuitry that may be suitable for use as the WLAN or BT radio IC circuitry 1406*a*/1406*b* (FIG. 14), although other circuitry configurations may also be suitable. Alternatively, the example of FIG. 16 may be described in conjunction with the example BT radio IC circuitry 1406*b*.

In some embodiments, the radio IC circuitry 1406*a* may include a receive signal path and a transmit signal path. The receive signal path of the radio IC circuitry 1406*a* may include at least mixer circuitry 1602, such as, for example, down-conversion mixer circuitry, amplifier circuitry 1606 and filter circuitry 1608. The transmit signal path of the radio IC circuitry 1406*a* may include at least filter circuitry 1612 and mixer circuitry 1614, such as, for example, up-conversion mixer circuitry. Radio IC circuitry 1406*a* may also include synthesizer circuitry 1604 for synthesizing a frequency 1605 for use by the mixer circuitry 1602 and the mixer circuitry 1614. The mixer circuitry 1602 and/or 1614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 16 illustrates only a simplified version of a radio IC circuitry, and may include, although not shown, embodiments where each of the depicted circuitries may include more than one component. For instance, mixer circuitry 1614 may each include one or more mixers, and filter circuitries 1608 and/or 1612 may each include one or more filters, such as one or more BPFs and/or LPFs according to application needs. For example, when mixer circuitries are of the direct-conversion type, they may each include two or more mixers.

In some embodiments, mixer circuitry 1602 may be configured to down-convert RF signals 1507 received from the FEM circuitry 1404*a-b* (FIG. 14) based on the synthesized frequency 1605 provided by synthesizer circuitry 1604. The amplifier circuitry 1606 may be configured to amplify the down-converted signals and the filter circuitry 1608 may include an LPF configured to remove unwanted signals from the down-converted signals to generate output baseband signals 1607. Output baseband signals 1607 may be provided to the baseband processing circuitry 1408*a-b* (FIG. 14) for further processing. In some embodiments, the output baseband signals 1607 may be zero-frequency baseband signals, although this is not a requirement. In some embodiments, mixer circuitry 1602 may comprise passive mixers, although the scope of the embodiments is not limited in this respect.

In some embodiments, the mixer circuitry 1614 may be configured to up-convert input baseband signals 1611 based on the synthesized frequency 1605 provided by the synthesizer circuitry 1604 to generate RF output signals 1509 for the FEM circuitry 1404*a-b*. The baseband signals 1611 may be provided by the baseband processing circuitry 1408*a-b* and may be filtered by filter circuitry 1612. The filter circuitry 1612 may include an LPF or a BPF, although the scope of the embodiments is not limited in this respect.

In some embodiments, the mixer circuitry 1602 and the mixer circuitry 1614 may each include two or more mixers and may be arranged for quadrature down-conversion and/or up-conversion respectively with the help of synthesizer 1604. In some embodiments, the mixer circuitry 1602 and the mixer circuitry 1614 may each include two or more mixers each configured for image rejection (e.g., Hartley image rejection). In some embodiments, the mixer circuitry 1602 and the mixer circuitry 1614 may be arranged for direct down-conversion and/or direct up-conversion, respectively. In some embodiments, the mixer circuitry 1602 and the mixer circuitry 1614 may be configured for super-heterodyne operation, although this is not a requirement.

Mixer circuitry 1602 may comprise, according to one embodiment: quadrature passive mixers (e.g., for the in-phase (I) and quadrature phase (Q) paths). In such an embodiment, RF input signal 1507 from FIG. 16 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1605 of synthesizer 1604 (FIG. 16). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1507 (FIG. 15) may comprise a balanced signal, although the scope of the embodiments is not limited in this respect. The I and Q baseband output signals may be provided to low-noise amplifier, such as amplifier circuitry 1606 (FIG. 16) or to filter circuitry 1608 (FIG. 16).

In some embodiments, the output baseband signals 1607 and the input baseband signals 1611 may be analog baseband signals, although the scope of the embodiments is not limited in this respect. In some alternate embodiments, the output baseband signals 1607 and the input baseband signals 1611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1604 may be a fractional-N synthesizer or a fractional N/N+1 synthesizer, although the scope of the embodiments is not limited in this respect as other types of frequency synthesizers may be suitable. For example, synthesizer circuitry 1604 may be a delta-sigma synthesizer, a frequency multiplier, or a synthesizer comprising a phase-locked loop with a frequency divider. According to some embodiments, the synthesizer circuitry 1604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1604 may be provided by a voltage controlled oscillator (VCO), although that is not a requirement. A divider control input may further be provided by either the baseband processing circuitry 1408*a-b* (FIG. 14) depending on the desired output frequency 1605. In some embodiments, a divider control input (e.g., N) may be determined from a look-up table (e.g., within a Wi-Fi card) based on a channel number and a channel center frequency as determined or indicated by the example application processor 1410. The application processor 1410 may include, or otherwise be connected to, one of the example secure signal converter 101 or the example received signal converter 103 (e.g., depending on which device the example radio architecture is implemented in).

In some embodiments, synthesizer circuitry 1604 may be configured to generate a carrier frequency as the output frequency 1605, while in other embodiments, the output frequency 1605 may be a fraction of the carrier frequency (e.g., one-half the carrier frequency, one-third the carrier frequency). In some embodiments, the output frequency 1605 may be a LO frequency (fLO).

Figure 17:
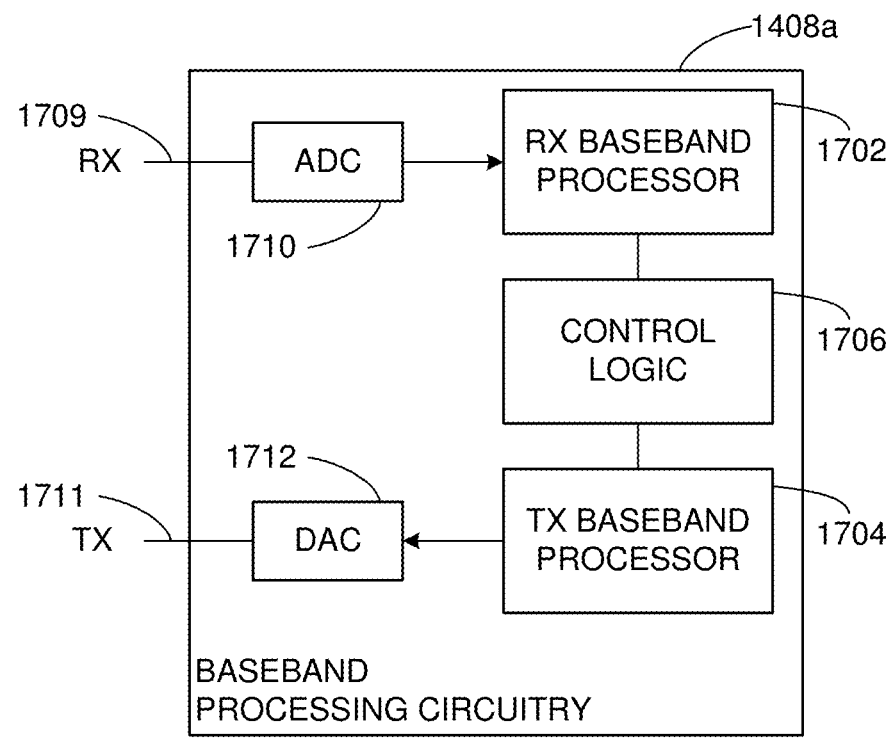
FIG. 17 illustrates an example baseband processing circuitry for use in the radio architecture of FIG. 14, in accordance with one or more example embodiments of the present disclosure.

FIG. 17 illustrates a functional block diagram of baseband processing circuitry 1408*a* in accordance with some embodiments. The baseband processing circuitry 1408*a* is one example of circuitry that may be suitable for use as the baseband processing circuitry 1408*a* (FIG. 14), although other circuitry configurations may also be suitable. Alternatively, the example of FIG. 16 may be used to implement the example BT baseband processing circuitry 1408*b* of FIG. 14.

The baseband processing circuitry 1408*a* may include a receive baseband processor (RX BBP) 1702 for processing receive baseband signals 1609 provided by the radio IC circuitry 1406*a-b* (FIG. 14) and a transmit baseband processor (TX BBP) 1704 for generating transmit baseband signals 1611 for the radio IC circuitry 1406*a-b*. The baseband processing circuitry 1408*a* may also include control logic 1706 for coordinating the operations of the baseband processing circuitry 1408*a*.

In some embodiments (e.g., when analog baseband signals are exchanged between the baseband processing circuitry 1408*a-b* and the radio IC circuitry 1406*a-b*), the baseband processing circuitry 1408*a* may include ADC 1710 to convert analog baseband signals 1709 received from the radio IC circuitry 1406*a-b* to digital baseband signals for processing by the RX BBP 1702. In these embodiments, the baseband processing circuitry 1408*a* may also include DAC 1712 to convert digital baseband signals from the TX BBP 1704 to analog baseband signals 1711.

In some embodiments that communicate OFDM signals or OFDMA signals, such as through baseband processor 1408*a*, the transmit baseband processor 1704 may be configured to generate OFDM or OFDMA signals as appropriate for transmission by performing an inverse fast Fourier transform (IFFT). The receive baseband processor 1702 may be configured to process received OFDM signals or OFDMA signals by performing an FFT. In some embodiments, the receive baseband processor 1702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 14, in some embodiments, the antennas 1401 (FIG. 14) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1401 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: establish a multi-link operation with an AP MLD, wherein the AP MLD comprises a plurality of APs within the AP MLD; set up a plurality of links between the AP MLD and the non-AP MLD, wherein the multi-link operation connects on each link of the plurality of links a respective AP of the AP MLD with a respective device of the non-AP MLD; encode a frame for transmission on a first link of the plurality of links between a first AP of the AP MLD and a first STA of the non-AP MLD; identify an indication received at a second STA of the non-AP MLD using an interference mitigation signal; cause to stop the transmission of the frame on the first link based on the indication; identify a second frame on the first link received from the first AP; and cause to resume the transmission of the first frame on the first link.

Example 2 may include the device of example 1 and/or some other example herein, wherein the processing circuitry may be further configured to cause to send an acknowledgement to the second frame.

Example 3 may include the device of example 1 and/or some other example herein, wherein the first frame may include a first preamble and a number of medium access control (MAC) protocol data units (MPDUs).

Example 4 may include the device of example 1 and/or some other example herein, wherein resuming the transmission may include adding a second preamble to remaining MPDUs of the first frame.

Example 5 may include the device of example 1 and/or some other example herein, wherein the indication may be a stop request and wherein the interference mitigation signal may be a Zadoff-Chu sequence (ZC) sequence.

Example 6 may include the device of example 1 and/or some other example herein, wherein the ZC sequence has a characteristic of $z_i^H z_j = 0$, $i \neq j$.

Example 7 may include the device of example 1 and/or some other example herein, wherein the processing circuitry may be further configured to perform cross-correlation to determine that the stop request may be assigned to the first STA.

Example 8 may include the device of example 1 and/or some other example herein, wherein the indication may include a packet destined to the second STA on the second link.

Example 9 may include the device of example 7 and/or some other example herein, wherein the packet may be received on second link without stopping transmission on the first link.

Example 10 may include the device of example 1 and/or some other example herein, wherein the non-AP MLD may be a non-simultaneous transmit receive (STR) device.

Example 11 may include a non-transitory computer-readable medium storing computer-executable instructions which when executed by one or more processors result in performing operations comprising: establishing a multi-link operation with an AP MLD, wherein the AP MLD comprises a plurality of APs within the AP MLD; setting up a plurality of links between the AP MLD and the non-AP MLD, wherein the multi-link operation connects on each link of the plurality of links a respective AP of the AP MLD with a respective device of the non-AP MLD; encoding a frame for transmission on a first link of the plurality of links between a first AP of the AP MLD and a first STA of the non-AP MLD; identifying an indication received at a second STA of the non-AP MLD using an interference mitigation signal; causing to stop the transmission of the frame on the first link based on the indication; identifying a second frame on the first link received from the first AP; and causing to resume the transmission of the first frame on the first link.

Example 12 may include the non-transitory computer-readable medium of example 11 and/or some other example herein, wherein the operations further comprise causing to send an acknowledgement to the second frame.

Example 13 may include the non-transitory computer-readable medium of example 11 and/or some other example herein, wherein the first frame may include a first preamble and a number of medium access control (MAC) protocol data units (MPDUs).

Example 14 may include the non-transitory computer-readable medium of example 11 and/or some other example herein, wherein resuming the transmission may include adding a second preamble to remaining MPDUs of the first frame.

Example 15 may include the non-transitory computer-readable medium of example 11 and/or some other example herein, wherein the indication may be a stop request and wherein the interference mitigation signal may be a Zadoff-Chu sequence (ZC) sequence.

Example 16 may include the non-transitory computer-readable medium of example 11 and/or some other example herein, wherein the ZC sequence has a characteristic of $z_i^H z_j = 0$, $i \neq j$.

Example 17 may include the non-transitory computer-readable medium of example 11 and/or some other example herein, wherein the operations further comprise performing cross-correlation to determine that the stop request may be assigned to the first STA.

Example 18 may include the non-transitory computer-readable medium of example 11 and/or some other example herein, wherein the indication may include a packet destined to the second STA on the second link.

Example 19 may include the non-transitory computer-readable medium of example 11 and/or some other example herein, wherein the non-AP MLD may be a non-simultaneous transmit receive (STR) device.

Example 20 may include a method comprising: establishing, by one or more processors, a multi-link operation with an AP MLD, wherein the AP MLD comprises a plurality of APs within the AP MLD; setting up a plurality of links between the AP MLD and the non-AP MLD, wherein the multi-link operation connects on each link of the plurality of links a respective AP of the AP MLD with a respective device of the non-AP MLD; encoding a frame for transmission on a first link of the plurality of links between a first AP of the AP MLD and a first STA of the non-AP MLD; identifying an indication received at a second STA of the non-AP MLD using an interference mitigation signal; causing to stop the transmission of the frame on the first link based on the indication; identifying a second frame on the first link received from the first AP; and causing to resume the transmission of the first frame on the first link.

Example 21 may include the method of example 20 and/or some other example herein, further comprising causing to send an acknowledgement to the second frame.

Example 22 may include the method of example 20 and/or some other example herein, wherein the first frame may include a first preamble and a number of medium access control (MAC) protocol data units (MPDUs).

Example 23 may include the method of example 20 and/or some other example herein, wherein resuming the transmission may include adding a second preamble to remaining MPDUs of the first frame.

Example 24 may include the method of example 20 and/or some other example herein, wherein the indication may be a stop request and wherein the interference mitigation signal may be a Zadoff-Chu sequence (ZC) sequence.

Example 25 may include the method of example 20 and/or some other example herein, wherein the ZC sequence has a characteristic of $z_i^H z_j = 0$, $i \neq j$.

Example 26 may include the method of example 20 and/or some other example herein, further comprising performing cross-correlation to determine that the stop request may be assigned to the first STA.

Example 27 may include the method of example 20 and/or some other example herein, wherein the indication may include a packet destined to the second STA on the second link.

Example 28 may include the method of example 27 and/or some other example herein, wherein the packet may be received on second link without stopping transmission on the first link.

Example 29 may include the method of example 20 and/or some other example herein, wherein the non-AP MLD may be a non-simultaneous transmit receive (STR) device.

Example 30 may include an apparatus comprising means for: establishing a multi-link operation with an AP MLD, wherein the AP MLD comprises a plurality of APs within the AP MLD; setting up a plurality of links between the AP MLD and the non-AP MLD, wherein the multi-link operation connects on each link of the plurality of links a respective AP of the AP MLD with a respective device of the non-AP MLD; encoding a frame for transmission on a first link of the plurality of links between a first AP of the AP MLD and a first STA of the non-AP MLD; identifying an indication received at a second STA of the non-AP MLD using an interference mitigation signal; causing to stop the transmission of the frame on the first link based on the indication; identifying a second frame on the first link received from the first AP; and causing to resume the transmission of the first frame on the first link.

Example 31 may include the apparatus of example 30 and/or some other example herein, further comprising causing to send an acknowledgement to the second frame.

Example 32 may include the apparatus of example 30 and/or some other example herein, wherein the first frame may include a first preamble and a number of medium access control (MAC) protocol data units (MPDUs).

Example 33 may include the apparatus of example 30 and/or some other example herein, wherein resuming the transmission may include adding a second preamble to remaining MPDUs of the first frame.

Example 34 may include the apparatus of example 30 and/or some other example herein, wherein the indication may be a stop request and wherein the interference mitigation signal may be a Zadoff-Chu sequence (ZC) sequence.

Example 35 may include the apparatus of example 30 and/or some other example herein, wherein the ZC sequence has a characteristic of $z_i^H z_j=0$, $i \neq j$.

Example 36 may include the apparatus of example 30 and/or some other example herein, further comprising performing cross-correlation to determine that the stop request may be assigned to the first STA.

Example 37 may include the apparatus of example 30 and/or some other example herein, wherein the indication may include a packet destined to the second STA on the second link.

Example 38 may include the apparatus of example 37 and/or some other example herein, wherein the packet may be received on second link without stopping transmission on the first link.

Example 39 may include the apparatus of example 30 and/or some other example herein, wherein the non-AP MLD may be a non-simultaneous transmit receive (STR) device.

Example 40 may include one or more non-transitory computer-readable media comprising instructions to cause an electronic device, upon execution of the instructions by one or more processors of the electronic device, to perform one or more elements of a method described in or related to any of examples 1-39, or any other method or process described herein.

Example 41 may include an apparatus comprising logic, modules, and/or circuitry to perform one or more elements of a method described in or related to any of examples 1-39, or any other method or process described herein.

Example 42 may include a method, technique, or process as described in or related to any of examples 1-39, or portions or parts thereof.

Example 43 may include an apparatus comprising: one or more processors and one or more computer readable media comprising instructions that, when executed by the one or more processors, cause the one or more processors to perform the method, techniques, or process as described in or related to any of examples 1-39, or portions thereof.

Example 44 may include a method of communicating in a wireless network as shown and described herein.

Example 45 may include a system for providing wireless communication as shown and described herein.

Example 46 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for a non-access point (AP) multi-link device (MLD) having a plurality of station devices (STAs), the device comprising processing circuitry coupled to storage, the processing circuitry configured: establish a multi-link operation with an AP MLD, wherein the AP MLD comprises a plurality of APs within the AP MLD; set up a plurality of links between the AP MLD and the non-AP MLD, wherein the multi-link operation connects on each link of the plurality of links a respective AP of the AP MLD with a respective device of the non-AP MLD; encode a first frame for transmission on a first link of the plurality of links between a first AP of the AP MLD and a first STA of the non-AP MLD; identify an indication received at a second STA of the non-AP MLD using an interference mitigation signal; cause to stop the transmission of the frame on the first link based on the indication; identify a second frame on the first link received from the first AP; and cause to resume the transmission of the first frame on the first link.

2. The device of claim 1, wherein the processing circuitry is further configured to cause to send an acknowledgement to the second frame.

3. The device of claim 1, wherein the first frame includes a first preamble and a number of medium access control (MAC) protocol data units (MPDUs).

4. The device of claim 1, wherein resuming the transmission includes adding a second preamble to remaining MPDUs of the first frame.

5. The device of claim 1, wherein the indication is a stop request and wherein the interference mitigation signal is a Zadoff-Chu sequence (ZC) sequence.

6. The device of claim 5, wherein the ZC sequence has a characteristic of $z\_i\hat{}H\ z\_j=0$, $i \neq j$.

7. The device of claim 1, wherein the processing circuitry is further configured to perform cross-correlation to determine that the stop request is assigned to the first STA.

8. The device of claim 1, wherein the indication includes a packet destined to the second STA on the second link.

9. The device of claim 8, wherein the packet is received on second link without stopping transmission on the first link.

10. The device of claim 1, wherein the non-AP MLD is a non-simultaneous transmit receive (STR) device.

11. A non-transitory computer-readable medium storing computer-executable instructions which when executed by one or more processors result in performing operations comprising: establishing a multi-link operation with an AP MLD, wherein the AP MLD comprises a plurality of APs within the AP MLD; setting up a plurality of links between the AP MLD and the non-AP MLD, wherein the multi-link operation connects on each link of the plurality of links a respective AP of the AP MLD with a respective device of the non-AP MLD; encoding a first frame for transmission on a first link of the plurality of links between a first AP of the AP MLD and a first STA of the non-AP MLD; identifying an indication received at a second STA of the non-AP MLD using an interference mitigation signal; causing to stop the transmission of the frame on the first link based on the indication; identifying a second frame on the first link received from the first AP; and causing to resume the transmission of the first frame on the first link.

12. The non-transitory computer-readable medium of claim 11, wherein the operations further comprise causing to send an acknowledgement to the second frame.

13. The non-transitory computer-readable medium of claim 11, wherein the first frame includes a first preamble and a number of medium access control (MAC) protocol data units (MPDUs).

14. The non-transitory computer-readable medium of claim 11, wherein resuming the transmission includes adding a second preamble to remaining MPDUs of the first frame.

15. The non-transitory computer-readable medium of claim 11, wherein the indication is a stop request and wherein the interference mitigation signal is a Zadoff-Chu sequence (ZC) sequence.

16. The non-transitory computer-readable medium of claim 15, wherein the ZC sequence has a characteristic of $z\_i\hat{}H\ z\_j=0$, $i \neq j$.

17. The non-transitory computer-readable medium of claim 11, wherein the operations further comprise performing cross-correlation to determine that the stop request is assigned to the first STA.

18. The non-transitory computer-readable medium of claim 11, wherein the indication includes a packet destined to the second STA on the second link.

19. The non-transitory computer-readable medium of claim 11, wherein the non-AP MLD is a non-simultaneous transmit receive (STR) device.

20. A method comprising: establishing, by one or more processors, a multi-link operation with an AP MLD, wherein the AP MLD comprises a plurality of APs within the AP MLD; setting up a plurality of links between the AP MLD and the non-AP MLD, wherein the multi-link operation connects on each link of the plurality of links a respective AP of the AP MLD with a respective device of the non-AP MLD; encoding a first frame for transmission on a first link of the plurality of links between a first AP of the AP MLD and a first STA of the non-AP MLD; identifying an indication received at a second STA of the non-AP MLD using an interference mitigation signal; causing to stop the transmission of the frame on the first link based on the indication; identifying a second frame on the first link received from the first AP; and causing to resume the transmission of the first frame on the first link.

* * * * *